United States Patent [19]

Packer

[11] Patent Number: 5,455,954
[45] Date of Patent: Oct. 3, 1995

[54] HOST INTERRUPT SIGNAL GENERATION CIRCUIT FOR CONTROLLING AN AUTO READ OPERATION IN A DISK DRIVE CONTROLLER

[75] Inventor: John S. Packer, Milpitas, Calif.

[73] Assignee: Adaptec, Inc., Milpitas, Calif.

[21] Appl. No.: 172,503

[22] Filed: Dec. 22, 1993

[51] Int. Cl.⁶ .............................. G06F 13/00; G06F 13/20
[52] U.S. Cl. ....................... 395/894; 395/439; 395/739; 360/97.01; 364/238.3; 364/248.1; 364/236.2; 364/242.1; 364/231; 364/DIG. 1
[58] Field of Search ...................... 395/725, 425, 395/275, 250; 360/97.01; 371/40.1

[56] References Cited

U.S. PATENT DOCUMENTS

| | | | |
|---|---|---|---|
| 3,950,735 | 4/1976 | Patel | 395/275 |
| 4,200,928 | 4/1980 | Allan et al. | 395/425 |
| 4,965,801 | 10/1990 | DuLac | 370/40.1 |
| 5,065,313 | 11/1991 | Lunsford | 395/275 |
| 5,097,439 | 3/1992 | Patriquin | 395/425 |
| 5,109,500 | 4/1992 | Iseki et al. | 395/425 |
| 5,133,060 | 7/1992 | Weber et al. | 395/425 |
| 5,241,630 | 8/1993 | Lattin, Jr. | 395/325 |
| 5,283,869 | 2/1994 | Adams et al. | 395/200 |

*Primary Examiner*—Gopal C. Ray
*Attorney, Agent, or Firm*—Skjerven, Morrill, MacPherson, Franklin & Friel; Edward C. Kwok

[57] ABSTRACT

A host interface uses a state machine to control multiple sector transfers between a host computer and a physical storage medium, so that the idle time between sector transfers is minimized and not a function of the local microprocessor. A write sector counter is provided to keep track of the largest segment in a buffer memory so that demands for the local microprocessor is minimized. In addition, start counters pointing at the next sector in the buffer memory are provided to shorten response time in a read cache. BUSY and IRQ timers are provided to accommodate various implementations of BIOS's which may inadvertently clear a host interrupt to lead to a failure condition.

2 Claims, 25 Drawing Sheets

HOST INTERRUPT SIGNAL GENERATION CIRCUIT FOR CONTROLLING AN AUTO READ OPERATION IN A DISK DRIVE CONTROLLER

BACKGROUND OF THE INVENTION

The present invention relates to the design of a disk drive controller, and in particular relates to the design of an AT Attachment interface (ATA) for a disk controller.

DESCRIPTION OF THE RELATED ART

The hard disk drive has become the primary storage device for personal computers. A typical hard disk drive, which is a magnetic storage device, is controlled by a hard disk drive controller which communicates with a host computer over a standard data bus. One typical configuration is shown in FIG. 1. As shown in FIG. 1, hard disk drive 120 has a rotating magnetic medium 140, a disk, that is magnetized in a certain pattern by a read/write head 141 which flies above the surface of disk 140. During a write operation, head 141 creates data patterns on the magnetic coating of rotating disk 140 which represent data, while in the read mode head 141 reads the data patterns created during the write operation.

In most high capacity hard disk drives, one or more read/write heads are provided per disk surface. Data is written in tracks which are located as concentric circles of the disk surface. The track locations are commonly referred to as cylinder locations for historical reasons. Data stored on a hard disk are generally divided into files. Each file represents a unit of data which is processed by computer 110. The files are stored on rotating disk 140 in sectors. The sectors which are written in one revolution of the disk form a track. Therefore, to specify the location of any particular piece of data on the disk surface a head address, a cylinder address, and a sector number are required. The head, cylinder, and sector addresses are sometimes referred to as the geometric address.

The operations performed by host computer 110 in response to a request from a computer program executing in host computer 110 to read data from or to write data to disk drive 120 are well known to those skilled in the art. Typically, during this operation, an electronic circuit 130 in disk drive 120 receives a request for a particular sector of data on one of the disks in drive 120, i.e., electronic circuit 130 is provided the geometric address for the sector.

The electronics in disk drive 120 include a microprocessor 121, typically a microcontroller such as the popular microprocessor 8080/8085 series sold by Intel Corporation of Sunnyvale, Calif., a storage controller integrated circuit 130 that interfaces microprocessor 121, drive electronics 123, computer interface bus 115 and random access memory 122. Drive electronics 123 convert the analog signals from read/write head 141 to digital signals for storage controller circuit 130, and control the mechanical operation of disk drive 120.

Computer interface bus 115 is, for example, the bus in an IBM AT personal computer or a clone of such a computer. The structure and operation of such personal computers are well known to those skilled in the art.

Storage controller integrated circuit 130 includes a microprocessor interface circuit 131, a disk controller circuit 132, buffer controller 133, and host interface circuit 134. The structure and operation of storage controller integrated circuit 130 are also well-known to those skilled in the art. For example, Cirrus Logic of Fremont, Calif. offers such an integrated circuit as Model No. SH260. Chips and Technology of San Jose, Calif. offers such an integrated circuit as Model No. 82C5059. Adaptec Corporation of Milpitas, Calif. offers Model Nos. AIC-6060 and AIC-7160.

The operations performed by microprocessor 121 are typically determined by program instructions that are loaded in microprocessor 121 from a non-volatile memory when disk drive 120 is turned on. Host computer 110 provides the geometric address to be accessed in a read/write request to circuit 130 asynchronously over computer interface bus 115. This information is passed through host interface circuit 134 and is stored directly in registers in circuit 130. Typically, circuit 130 includes registers and counters necessary to emulate the International Business Machines (IBM) Task file. The IBM Task File is defined in *IBM PC/AT Technical Reference* which is available from IBM and is incorporated herein by reference in its entirety. Alternately, the command blocks registers defined in the ATA specification may be utilized.

Upon receipt of the read/write request and the geometric address, microprocessor 121 performs the necessary operations to initialize host bus interface circuit 134, disk interface circuit 132 and buffer control circuit 133 for the requested read or write operation. The initialization signals are passed from microprocessor 121 through microprocessor interface circuit 131 to the other circuits over microprocessor control bus 136. For clarity, the control signals lines between microprocessor 121 and microprocessor interface circuit 131 as well as the control signal lines between disk interface circuit 132, buffer control circuit 133, computer bus interface circuit 134 and RAM 122 are not shown in FIG. 1.

After initialization for a read operation, data is passed from drive electronics 123 to disk controller circuit 132 which in turn sends the data to buffer control circuit 133. Buffer control circuit 133 stores the data in RAM 122. When a complete sector of data is stored in RAM 122, microprocessor 121 initiates a transfer of the data from RAM 122 to a first-in-first-out (FIFO) memory in host interface circuit 134. When the FIFO memory is full, circuit 134 initiates an interrupt to host computer 110 by setting a host interrupt signal IRQ to indicate that the sector of data is ready. The sector of data is then transferred over host interface bus 115 to host computer 110.

When the sector transfer is complete, microprocessor 121 performs all the work necessary for host computer 110 to initiate transfer of the next sector. During this steps in circuit 130 are set up and initiated by microprocessor 121.

In recent years, low power, high data access speed, and high capacity are especially important objectives in disk drive design. Consequently, successive generations of hard disk drives put more and more tracks on smaller and smaller disk surfaces. In addition, to allow data to be accurately accessed within the ever-decreasing required access time, servo information are permanently imprinted on the disk surface to guide the drive electronics. At the same time, greater supervision by microprocessor 121 is required to control the servo electronics. Further, since minimizing the cost of the hard disk drive is an important objective, there is an incentive to implement microprocessor 121 using the currently supported microprocessors, rather than migrating to higher performance but more expensive microprocessors. Thus, there is a need for a capability to efficiently transfer a large volume of data between the physical media (i.e. disk interface circuit 132) and the host processor 115 with minimal intervention by microprocessor 121.

In one implementation of the prior art, a limited degree of automation is provided by a circuit which supports an "Auto write" command. In an Auto write command, transfer of the first sector from host computer 110 is initiated by the decoding logic of a command decoder in host interface 134. However, in that implementation, other than the automatic command execution of the first sector of data when the buffer controller has been previously setup, microprocessor 121 performs substantially the same tasks as described above.

SUMMARY OF THE INVENTION

In accordance with the present invention, a method and a structure are provided in a hard disk controller to automatically transfer multiple sectors or blocks of data between a host processor and a physical mass storage medium without intervention by the microprocessor of the hard disk controller, thereby allowing such a hard disk controller to be implemented with a microprocessor of the prior art, even though advances in technology have required such a microprocessor to perform increasingly sophisticated and computationally intensive tasks.

The structure of the present invention includes a host interface circuit having a command decoding circuit for decoding read and write commands received from the host computer, wherein the command decoding circuit provides a start signal to trigger the operation of a state machine. Such a state machine, upon receiving the start signal, generates a set of control signals which control the remaining execution of the command. In one embodiment, the state machine controls the asynchronous transfer of data between the host computer and a first-in-first-out (FIFO) memory and the synchronous transfer of data between the (FIFO) memory and the buffer memory. The state machine also updates the address counters in the host machine interface to sequence the multiple sectors or blocks of data transferred. The state machine also generates an interrupt signal to a microprocessor upon the complete execution of the command. The controller circuit also causes an interrupt signal to be generated at said host computer upon complete transfer the portion of the data associated with each of the address to or from said host computer.

In one embodiment, the state machine sets a busy timer to define a time duration which corresponds to the time period required between a completion of data transfer associated with one address and the beginning of data transfer associated with the following address.

In accordance with another aspect of the present invention, a read cache control circuit includes a start counter and a working counter each holding an address, and a comparator circuit indicating that the addresses in the counter and the worker counter are equal. In one embodiment, a READ command brings into a buffer memory data not only from the requested sectors or blocks in the physical media, but also data in the sectors or blocks contiguous to those specified in the READ command. Initially, both the working counter and the start counter are provided the same address and are both incremented as data corresponding to each of the specified addresses are transferred. At the completion of execution of the READ command, the start counter is updated but not cleared, so that the start counter points to the data in the buffer memory corresponding to the next address. Consequently, if an Auto READ command is issued, the requested data may be returned from the buffer memory immediately, without incurring the overhead cost of an access to the physical medium.

In accordance with another aspect of the present invention, an automatic write control circuit in a disk controller circuit is provided. The automatic write control circuit includes a counter (AWSCTR) indicating the available space in a memory block of the external buffer memory. As data is written into the memory block, the count in the AWSCTR is updated to reflect the size of the remaining space in the buffer memory. In one embodiment, as long as the AWSCTR is greater than zero, multiple blocks and multiple sectors automatic transfer of data can proceed without intervention by a microprocessor.

In accordance with another aspect of the present invention, in a disk controller communicating with a host computer over an AT bus, a method is provided for setting a host interrupt during a READ command transferring multiple sectors or blocks of data. The method allows a user of the disk controller to define one of three modes for generating an IRQ signal prior to transferring each block or sector of data. In a first mode, the host interrupt IRQ signal is generated in accordance with the elapse of a predetermined time interval. In a second mode, a host interrupt IRQ signal is generated when the earlier occurrence of either (a) the host computer reading an AT status register, or (b) the elapse of the predetermined time interval is met. The third mode relies on detecting the host computer reading said AT status register.

The present invention is better understood upon consideration of the detailed description set forth below and the accompanying drawings.

Appendix A, consisting of three pages, is a machine compilable listing of a VHDL code, which is used to generate a logic circuit implementation of R/W state machine 310.[1]

[1] All rights, to the VHDL listing in Appendix A, including all copyrights, are reserved by Adaptec, Inc., Milpitas, Calif.

DETAILED DESCRIPTION OF THE PREFERRED EMBODIMENTS

The present invention provides, in a hard disk controller, an interface to a host computer which allows transfer of multiple blocks or sectors of data between the hard disk and the host processor without the intervention of the local microprocessor. The present invention also provides a capability to implement an Auto READ command, by which at least a portion of the requested data is retrieved from a read cache in a buffer memory, thereby minimizing time-consuming accesses to the physical storage medium and providing a quicker response time.

Figure 1:
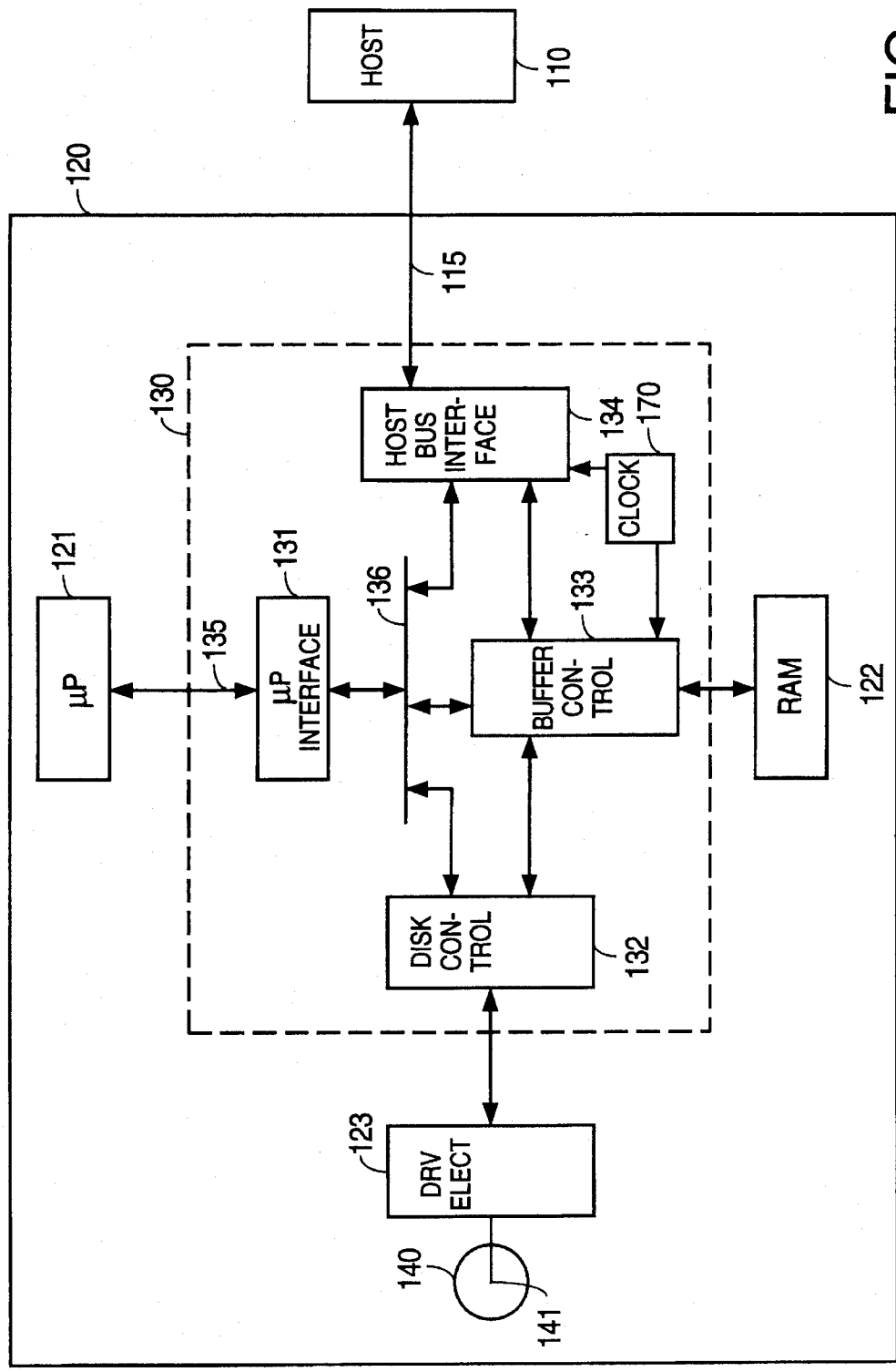
FIG. 1 is a block diagram of a prior art hard disk drive and controller combination 120 communicating with a host processor 110 on AT bus 115.
Figure 2:
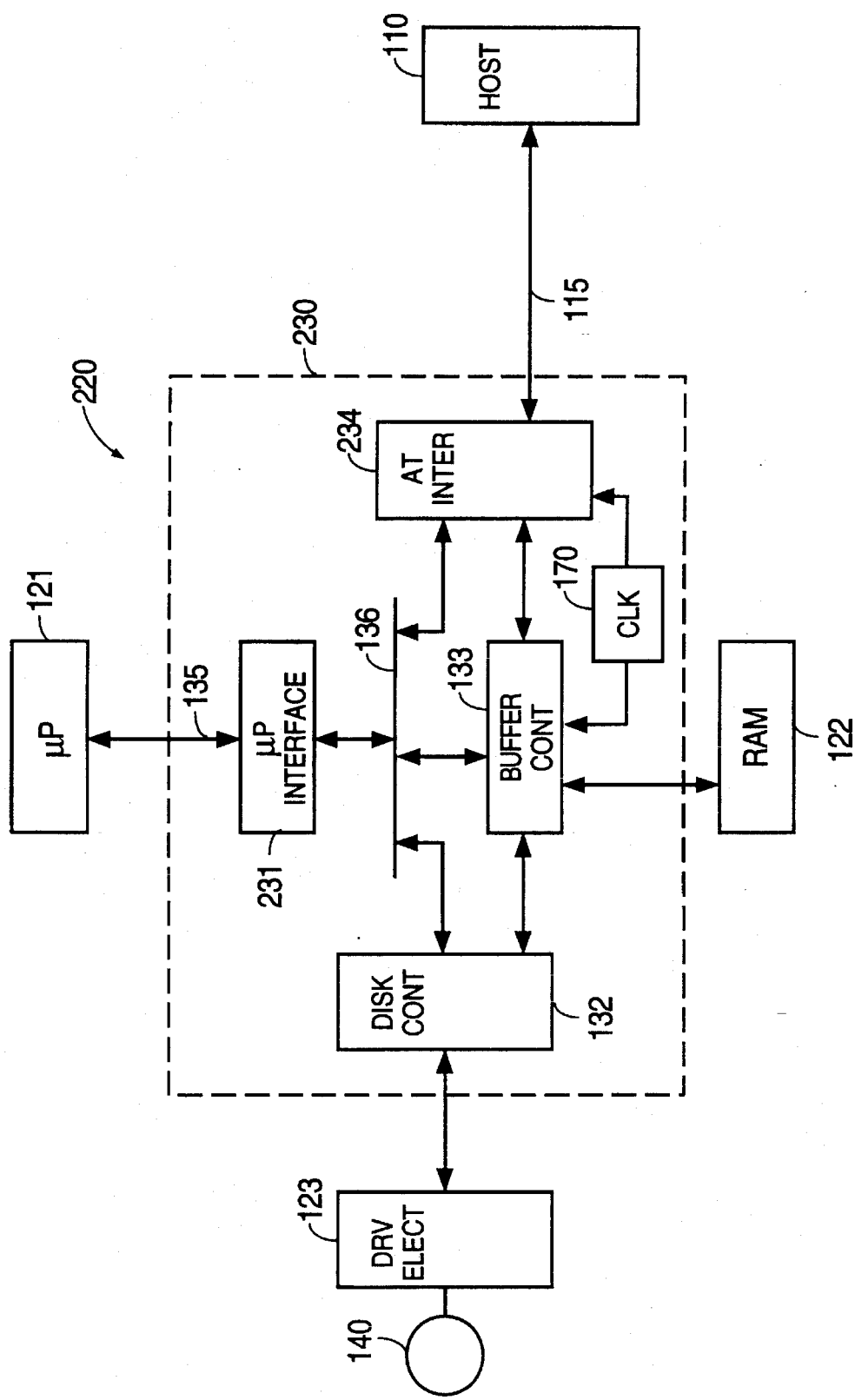
FIG. 2 is a block diagram of a hard disk drive and controller combination 220 communicating with a host processor 110 on AT bus 115, in accordance with the present invention.

One embodiment of the present invention, which is provided to illustrate the present invention, is shown in FIG. 2. To facilitate referencing, elements in FIG. 2 which correspond to elements in FIG. 1 are provided the same reference numerals. In FIG. 2, a hard disk drive and controller combination 220 includes an integrated circuit 230, which controls drive electronics assembly 123, which in turn controls the physical magnetic storage medium 140. Integrated circuit 230 can access a random access memory (RAM) 122, which provides intermediate buffer storage between the physical mass storage medium 140 and devices external to hard disk drive and controller combination 220. Integrated circuit 230 interfaces with local microprocessor 121 over a local bus 135, and a host processor 110 over a host interface bus 115 (the "AT bus"). In this embodiment, the signals on AT bus 115 follow the popular ATA convention. A version of this ATA convention is described in "Information Technology—ATA Attachment interface for Disk Drives", ANSI X3.221-199x (working draft X3T9.2 791D). One of ordinary skill would appreciate that AT bus 115 can also be used by devices other than host processor 115 to communicate with hard disk drive and controller combination 220. Typically, such other devices would read and write data using a direct memory access (DMA) method. Under the ATA convention, two physical drives, drive 0 and drive 1, can be supported by a single hard disk controller.

As shown in FIG. 1, integrated circuit 230 includes a physical disk controller circuit 132, which interfaces with drive electronics assembly 123, and a buffer controller circuit 133, which interfaces with RAM 122. Physical disk controller circuit 132 and buffer controller circuit 133 can be implemented in a conventional manner. Examples of such physical disk controller and buffer controller can be found, for example, in a copending patent application (the "Copending Application"), entitled "Intelligent Hardware for Automatic Reading and Writing Multiple Sectors and Data between a Computer and a Disk Drive," by Andy J Liu, Ser. No. 08/153,560, filed on Nov. 17, 1993, which is a continuation of a U.S. patent application, filed on Aug. 7, 1991, Ser. No. 07/741,872, now abandoned, and assigned to Adaptec, Inc., which is also the Assignee of the present invention. For illustrative purposes, the disclosure of the Copending Application is hereby incorporated by reference in its entirety.

In addition, integrated circuit 230 includes a microprocessor interface 231, which is programmable to interface on bus 135 with one of a number of microprocessors. Microprocessor 230 translates the signals received on bus 135 to a set of internal signals on internal bus 136. Internal bus 136 is invariant regardless of which microprocessor inplements microporcessor 121. In this embodiment, microprocessor 121 can be implemented by a number of popular microprocessors, such as microprocessors 80C51/31 and 80C196, and 68HC11. The 80C51/31 and 80C196 microprocessors are available from Intel Corporation, Santa Clara, Calif., and the 68C11 microprocessor is available from Motorola, Inc., Austin, Tex.

Overview

Figure 3:
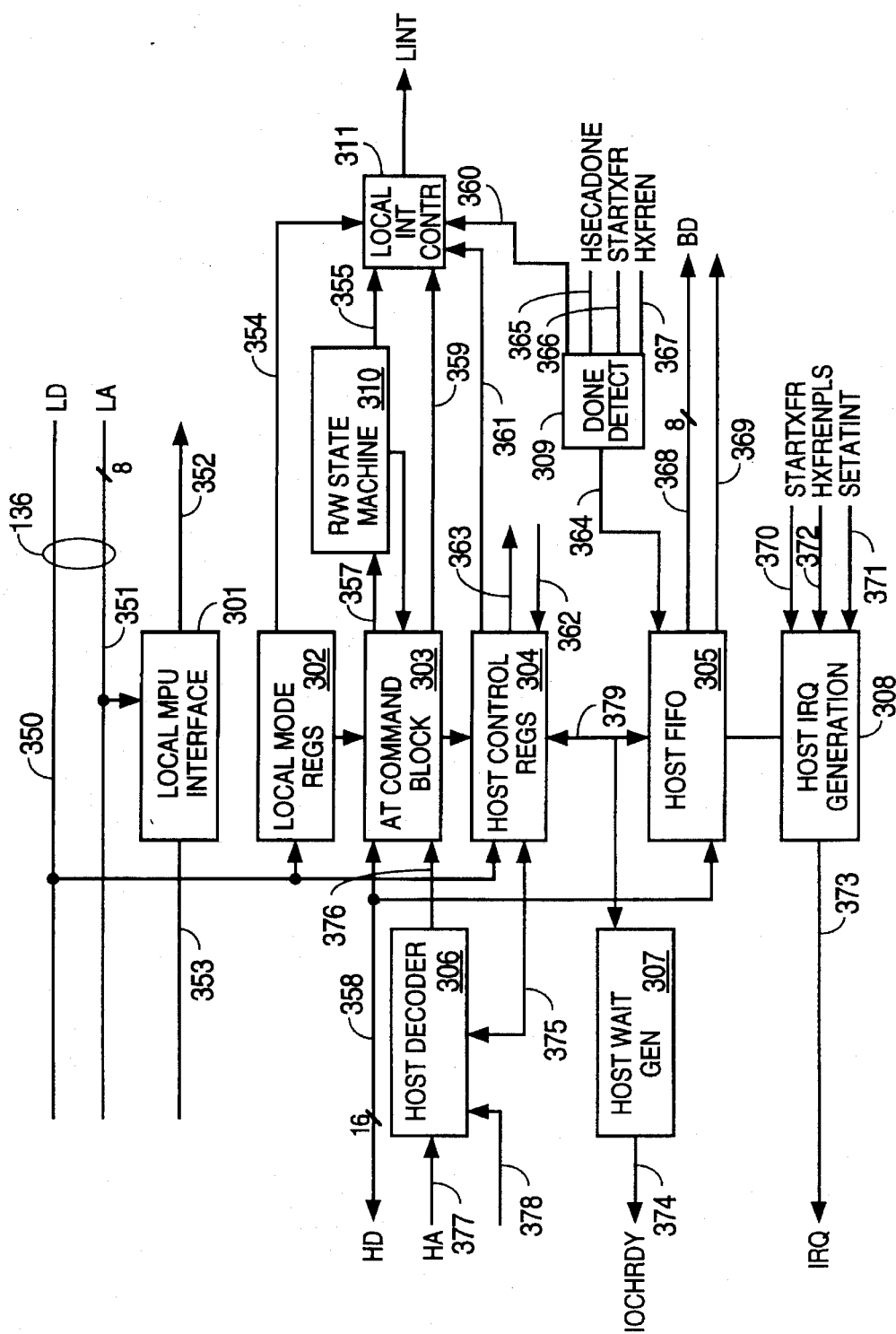
FIG. 3 is a block diagram showing AT interface 234 of the present invention.

A block diagram showing the functional blocks of AT bus interface 234 is provided in FIG. 3. In FIG. 3, local microprocessor interface 301 is a second level decoding of the signals on bus 136 of microprocessor interface 231 discussed above. AT bus interface 234 further include local mode register 302, AT command block 303, host control registers 304, host decoder 306, host wait generation circuit 307, host first-in-first-out buffer ("host FIFO") 305, interrupt request generation ("IRQ generation") circuit 308, done detection circuit 309, read/write ("R/W") state machine 310 and local interrupt circuit 311. Host control registers 304 are a set of registers accessible by host computer 110 to define the host computer's operating modes, interface parameters and the status registers for drive 0 and drive 1. Of particular relevance is the AT STATUS register, which includes the value of the control signal ATBUSY which, when set, prevents host computer 110's access to host FIFO 305. When ATBUSY is set, host computer 110 is allowed access only to the AT STATUS register and a limited number of other host control registers. Local mode registers 302 are control registers accessible by microprocessor 121.

The output signals of host control registers 304 and local mode control registers 302, along with output signals of other functional blocks of AT interface 234, are selectively multiplexed onto host data bus 358 and local microprocessor data bus 351. To promote clarity and to avoid details unnecessarily distracting from the present detailed description, such multiplexers are not shown. One of ordinary skill in the art will be able to provide such multiplexers, so that input and output of signals on the microprocessor bus 136 and host bus 115 can be achieved, as needed. Also, the connections between functional blocks in AT interface 234 are generally shown in FIG. 3. However, to maintain clarity, some specific connections between the functional blocks of AT interface 234 are omitted in FIG. 3. The following detailed description includes some of these connections not shown in FIG. 3.

In this embodiment, two kinds of transfer modes are supported: the manual transfer mode, which requires microprocessor 121 to intervene at many stages of a sector or a block transfer operation, and an automatic transfer mode, provided in accordance with the present invention, which performs multiple sector or block transfers with minimal intervention by microprocessor 121. The automatic and manual transfer modes are not to confused with "Auto read" or "Auto write" commands, which can be executed both in manual and automatic transfer modes and are started automatically without intervention by microprocessor 121. Under the manual transfer mode, "Auto read" and "Auto write" commands are handled by microprocessor 121 after the first block or sector transfer. The Auto read command, which is provided in accordance with the present invention, is described in further detail below. To distinguish Auto commands from those commands initiated by microprocessor 121, in the remainder of this detailed description, the commands initiated by microprocessor 121 are referred to as "Normal" commands (i.e. Normal read and write commands). In this embodiment, READ and WRITE commands transfer data either sector by sector (i.e. READ Sectors and WRITE Sectors commands) or block by block (i.e. READ Multiple and WRITE Multiple commands). A block is a fixed number of sectors defined in the BLKSIZE register. Under the manual transfer mode, in a READ or WRITE Sectors command, microprocessor 121 intervenes after each sector is transferred. Likewise, under the manual transfer mode, in a READ or WRITE Multiple command, microprocessor 121 intervenes after transfer of each block.

Figure 11A:
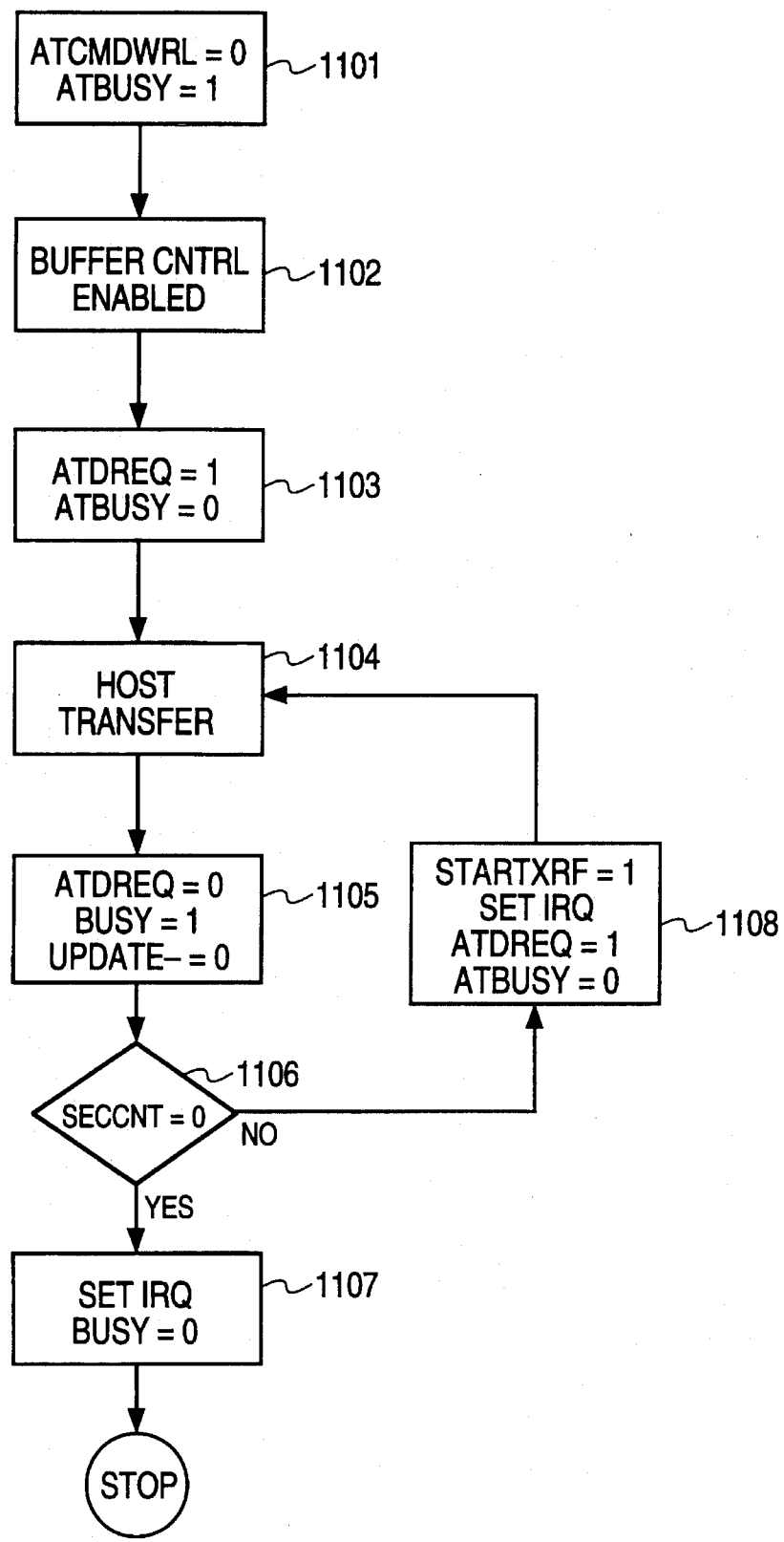
FIG. 11a is a flow diagram of the high level sequence of events in a host WRITE operation, regardless of transfer mode or command type.
Figure 11B:
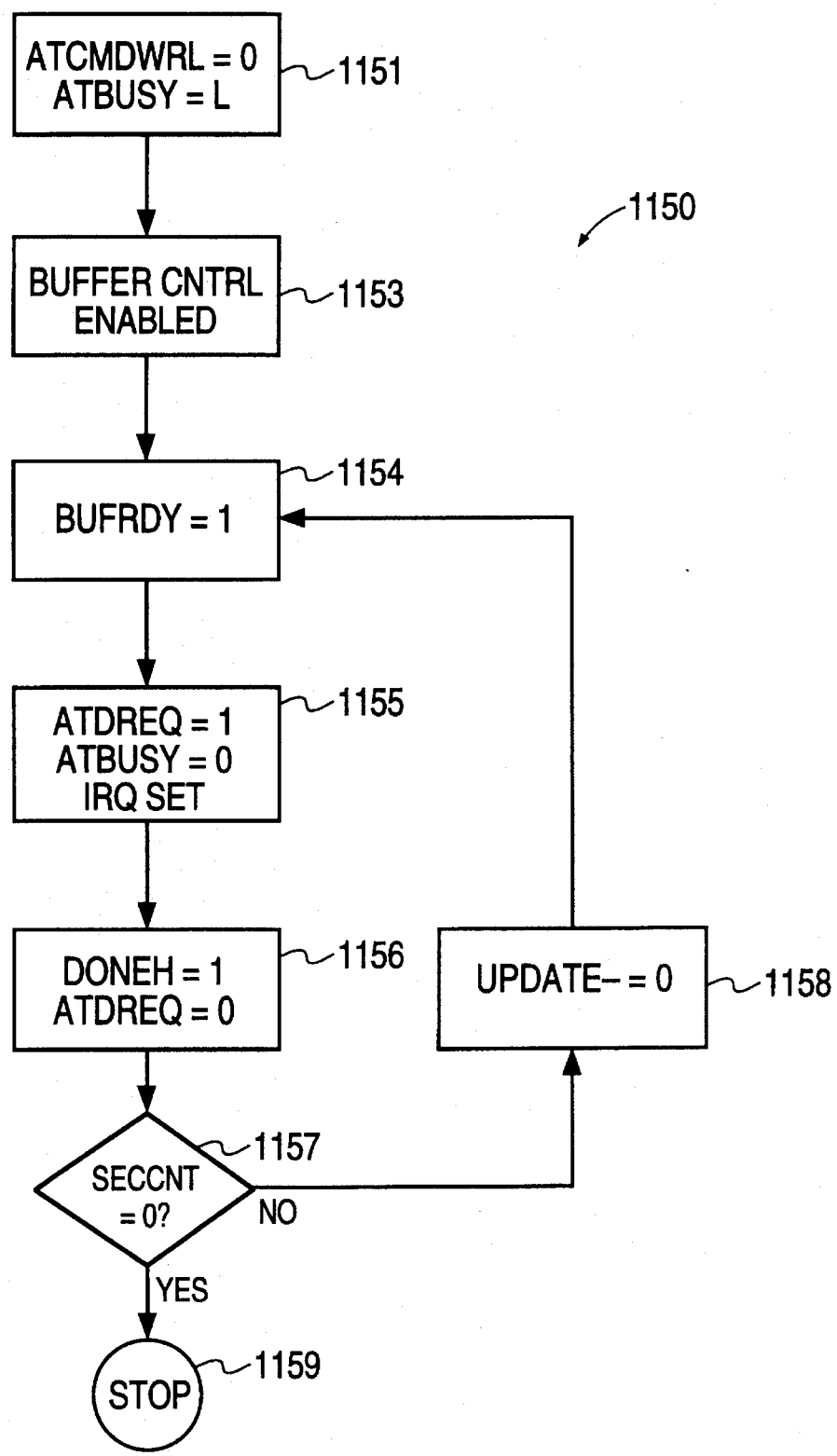
FIG. 11b is a flow diagram of the high level sequence of events in a host READ operation, regardless of transfer mode or command type.

The high level sequence of events for a READ command and a WRITE command are summarized in FIGS. 11a and 11b, respectively, regardless of command type and transfer mode. In FIGS. 11a and 11b, the transfers between RAM 122 and physical medium 140, which must occur, are omitted to enhance clarity of presentation. One of ordinary skill in the art would appreciate the processes involved in the transfers between RAM 122 and physical medium 140, upon consideration, for example, of the Copending Application discussed above.

As shown in FIG. 11a, at the first state 1101 of a host WRITE operation, host computer writes a WRITE command into the COMMAND register in AT Command Block 303. As a result, the control signal ATCMDWRL is set, which triggers command execution. In response to initiation of command execution, a control signal BUSY is set. This BUSY signal is latched into a register, which in turn generates the value of the status bit ATBUSY in the AT STATUS register. The ATBUSY status bit, which is set when control signal BUSY is set and a "data request" (ATDREQ) signal is reset, prevents host computer 110 from writing into the AT Command block 303 during the initialization steps for executing the command.

At the next state, state 1102, buffer controller 133 is enabled in preparation of data transfer between RAM 122 and host computer 110. If the command is a Normal command, a control signal to enable buffer controller 133 is generated by local microprocessor 121. Otherwise, buffer controller 113 is enabled by a control signal from command decoder 306.

When a data transfer is ready, a control signal BUFRDY ("buffer ready") is set in state 1103. Host FIFO 305 then issues a control signal ATDREQ to indicate that host FIFO 305 is ready to receive data from host computer 110. Simultaneously, the status bit ATBUSY is reset to allow host communication.

Upon detecting the ATDREQ signal, host computer 110 transfers a sector, or a block of data, depending upon whether the command executed is a "WRITE Multiple" command (i.e. a command that transfers a block at a time), or a sector at a time, and asserts a write strobe signal IOW- for each word of each sector transferred. In response, at state 1104, host FIFO 305 latches the data from host interface bus 115 into host FIFO 305. During this period, as data fills host FIFO 305, buffer controller 133 removes the data from host FIFO 305 into RAM 122, until transfer from host computer 110 of the block or sector of data is complete.

When the transfer of the block or sector of data from host computer 110 is complete, i.e. at state 1105, the ATDREQ signal is reset, and the busy signal ATBUSY is set. Buffer controller 133 then transfers the remaining data in host FIFO 305 into RAM 122. When the transfer from host FIFO 305 to RAM 122 is complete, a control signal UPDATE- is set to decrement a sector counter in AT Command Block 303 and to update the geometric address to the next sector. At decision point 1106, if the sector count ("SECCNT") in the SECCNT register of AT Command block 303 becomes zero (i.e. all sectors in the command transferred), at state 1107, host interrupt IRQ signal is set, the status bit ATBUSY is reset, and the process stops (i.e. goes to an idle state prior to state 1101). Otherwise, at state 1108, a control signal STARTXFR- is asserted, which causes the control signal ATDREQ to reset, thereby setting the status bit ATBUSY, and the process returns to state 1104. In state 1108, the host interrupt IRQ signal is set; this host interrupt IRQ signal is frequently used by host computer 110 to detect the data request (i.e. ATDREQ) signal.

As shown in FIG. 11b, at state 1151, host computer 110 writes a READ command into the COMMAND register of AT Command Block 303. As a result, the status bit ATBUSY is set. Before the command in the COMMAND register of AT Command Block 303 is loaded, the SECNUM, CYL and DRVHEAD registers in AT Command Block 303 are each loaded with their respective portion of a geometric address.

At state 1153, buffer controller 133 is enabled, either, in a Normal command, by microprocessor 121 or, in an Auto command, by a control signal from Command decoder 306. If the command is a Normal command, physical disk controller circuit 132 then accesses the desired location on the physical medium 140, and transfers the data to buffer controller 133, which writes the data into RAM 122. Otherwise, if the command is an Auto READ command, the data sought is assumed already in RAM 122, physical disk controller circuit 132 is not enabled, unless the amount of requested data exceeds the data then cached in RAM 122.

At state 1154, when the transfer of a minimum number of sectors is complete, buffer controller 133 sets the control signal BUFRDY. At state 1155, buffer controller 133 transfers data from RAM 122 until host FIFO 305 is full. At that point host FIFO 305 sets the data request signal ATDREQ, thereby resetting status bit ATBUSY, and sets host interrupt IRQ to allow host computer 110 to initiate data transfer from host FIFO 305 by asserting the IOR- signal.

Upon detecting the host interrupt IRQ signal, host computer 110 reads one sector or one block of data. During this period, as data is emptied from host FIFO 305 into host computer 110, buffer controller 133 replenishes host FIFO 305 until a block or sector of data is read by host computer 110.

At state 1156, when done detector 309 detects completion of a block or sector transfer from host computer 110, the control signal DONEH (i.e. host transfer complete) is set, so as to prevent any further transfer by buffer controller 133 into FIFO 305.

At decision point 1157, if the sector just transferred is not the last sector in the current command to be transferred, status bit ATBUSY is again reset, and, at state 1158, the control signal UPDATE- is asserted to bring the geometric address to point to the next sector, and reenters state 1154. Otherwise, command execution is complete, and the process enters an idle state prior to state 1151.

Note that, under the automatic transfer mode, control of command execution is provided by R/W state machine 310. In the manual transfer mode, if the command is an Auto command, the transfer of the first sector or block is controlled by R/W state machine 310. Thereafter, microprocessor 121 takes over.

In the manual transfer mode, as in the prior art, the microprocessor 121 intervenes at various points of the READ or WRITE operation. To illustrate the differences between the manual transfer mode and the automatic transfer mode, FIGS. 12a, 12b, 13a, and 13b are provided below.

Figure 12A:
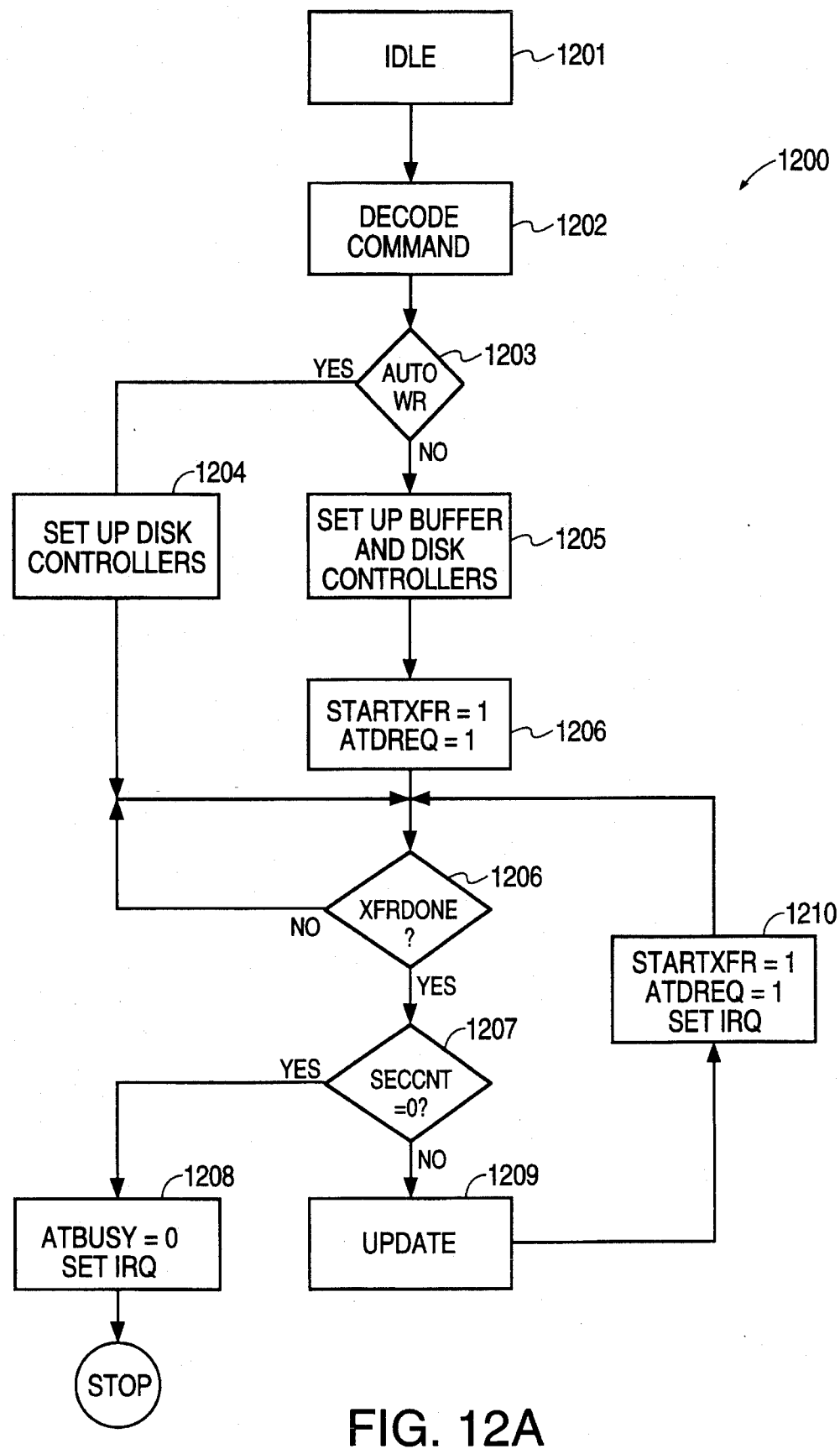
FIG. 12a is a flow diagram of the high level sequence of events in local microprocessor 121 during a host WRITE operation, under the manual transfer mode.

FIG. 12a is a flow diagram 1200 of the high level sequence of events in local microprocessor 121 during a host WRITE operation, under the manual transfer mode. Initially microprocessor 121 is in an idle state 1201, waiting for the receipt of a command from host computer 110. Then host computer 110 writes into the COMMAND register in AT Command Block 303 a command, which is decoded at state 1202 to be a WRITE command. If the command received is an Auto Write command, microprocessor 121 sets up disk controller circuit 132 at state 1204. Buffer controller circuit 133 is set up in an Auto Write command by the command decode mechanism, which also starts data transfer between host computer 110 and host FIFO 305. Microprocessor 121 then waits at decision point 1206 for the complete transfer of one block or sector.

If, however, the command received is not an Auto WRITE command, microprocessor 121 enters state 1205, in which microprocessor 121 enables both buffer controller 133 and disk controller 132 at state 1205. Then, at state 1206, microprocessor 121 initiates a host transfer by setting the control signal STARTXFR, and resets status bit ATBUSY by setting data request bit ATDREQ. Microprocessor 121 then waits at decision point 1206 for an interrupt ("XFRDONE interrupt") indicating the complete transfer of the first sector or block of data.

Upon receipt of the XFRDONE interrupt, microprocessor 121 checks a status signal SECCNTEQ0, which indicates whether SECCNT has become zero. At this point, if SECCNTEQ0 is set, the sector just transferred is the last sector to be transferred in the current command. Microprocessor 121 then enters state 1208, in which it resets the status bit ATBUSY and sets the host interrupt IRQ signal, thereby completing the execution of the Write command.

However, if SECCNTEQ0 is reset, i.e. there are remaining sectors to be transferred, microprocessor 121 enters state 1209, in which the geometric address in AT Command block 303 is updated. Microprocessor 121 then enters the state 1210, in which it sets the control signals STARTXRF and ATDREQ to initiate the next transfer from host processor 110, and sets the host interrupt IRQ signal. Microprocessor 121 then waits at decision point 1206 for the XFRDONE interrupt. Thereafter, even under an Auto WRITE command, each sector is transferred under the control of microprocessor 121 substantially in the same manner as in the execution of a Normal command. Thus, except for the first sector or block transferred under an Auto Write command, microprocessor 121 intervenes substantially in the executing the WRITE command.

Figure 12B:
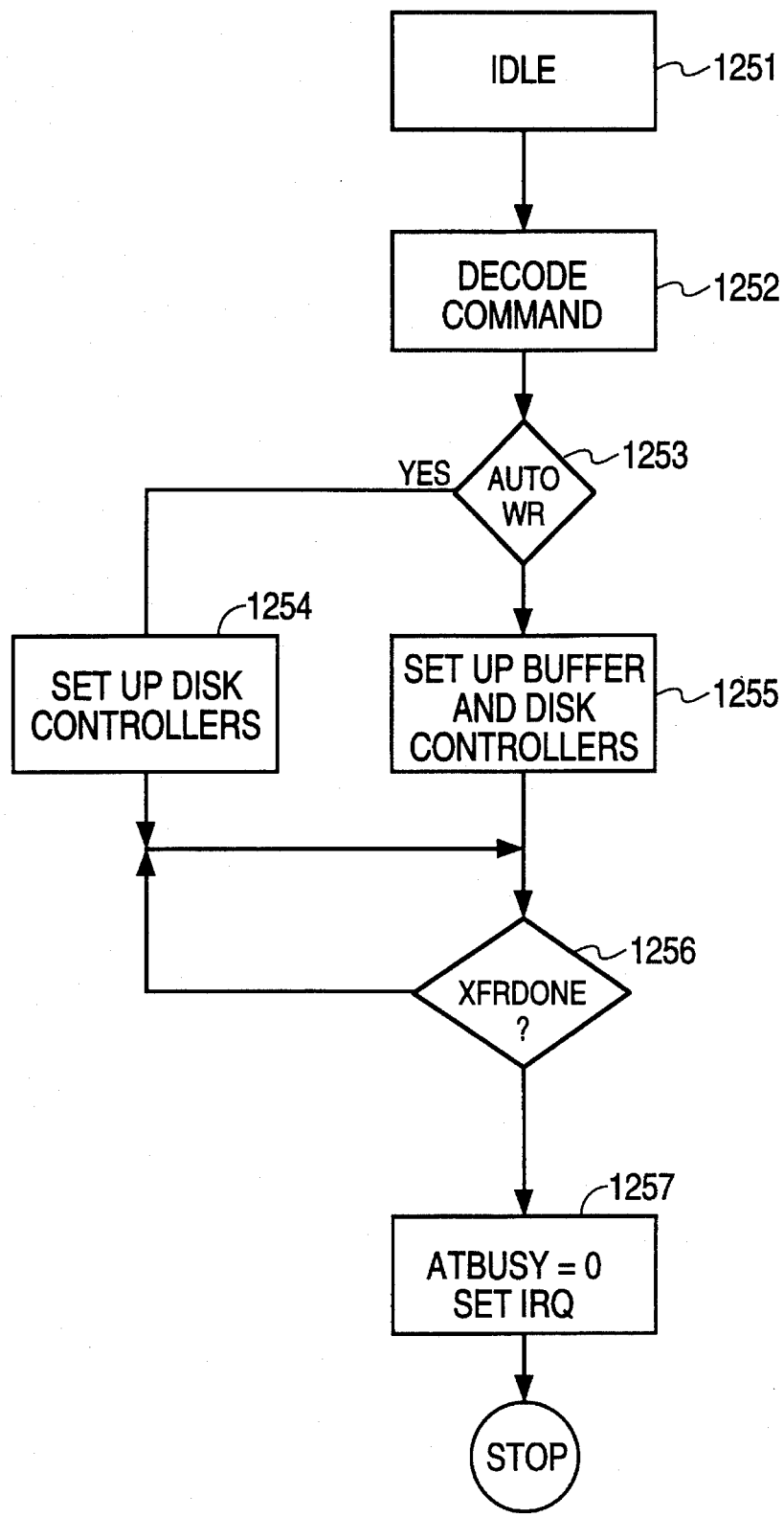
FIG. 12b is a flow diagram of the high level sequence of events in local microprocessor 121 during a host WRITE operation, under the automatic transfer mode.

FIG. 12b is a flow diagram 1250 of the high level sequence of events in local microprocessor 121 during a host WRITE operation, under the automatic transfer mode. The Automatic transfer mode is enabled by setting the control bit ENMULXFR. Initially, at state 1251, microprocessor 121 waits for a command to be written into the COMMAND register of AT Command block 303. At state 1252, the command in the COMMAND register is decoded by Command decoder 306 to be a WRITE command. If the command is an Auto Write command, microprocessor 121 sets up disk controller circuit 132, if it is not already set up, and microprocessor 121 waits for the XFRDONE interrupt at decision point 1256. Alternatively, if the command in the COMMAND register of AT Command block 303 is a Normal command, both disk controller 132 and buffer controller 133 are set up and proceed to wait for the XFRDONE interrupt at decision point 1256. Under the automatic transfer mode, data transfer is controlled by R/W state machine 310, which is described in further detail below. Upon completion of transfer of all sectors, R/W state machine 310 generates the XFRDONE interrupt, upon which microprocessor 121 enters state 1257. In state 1257, microprocessor 121 resets status bit ATBUSY and sets the host interrupt IRQ signal to indicate complete execution of the WRITE command.

Figure 13A:
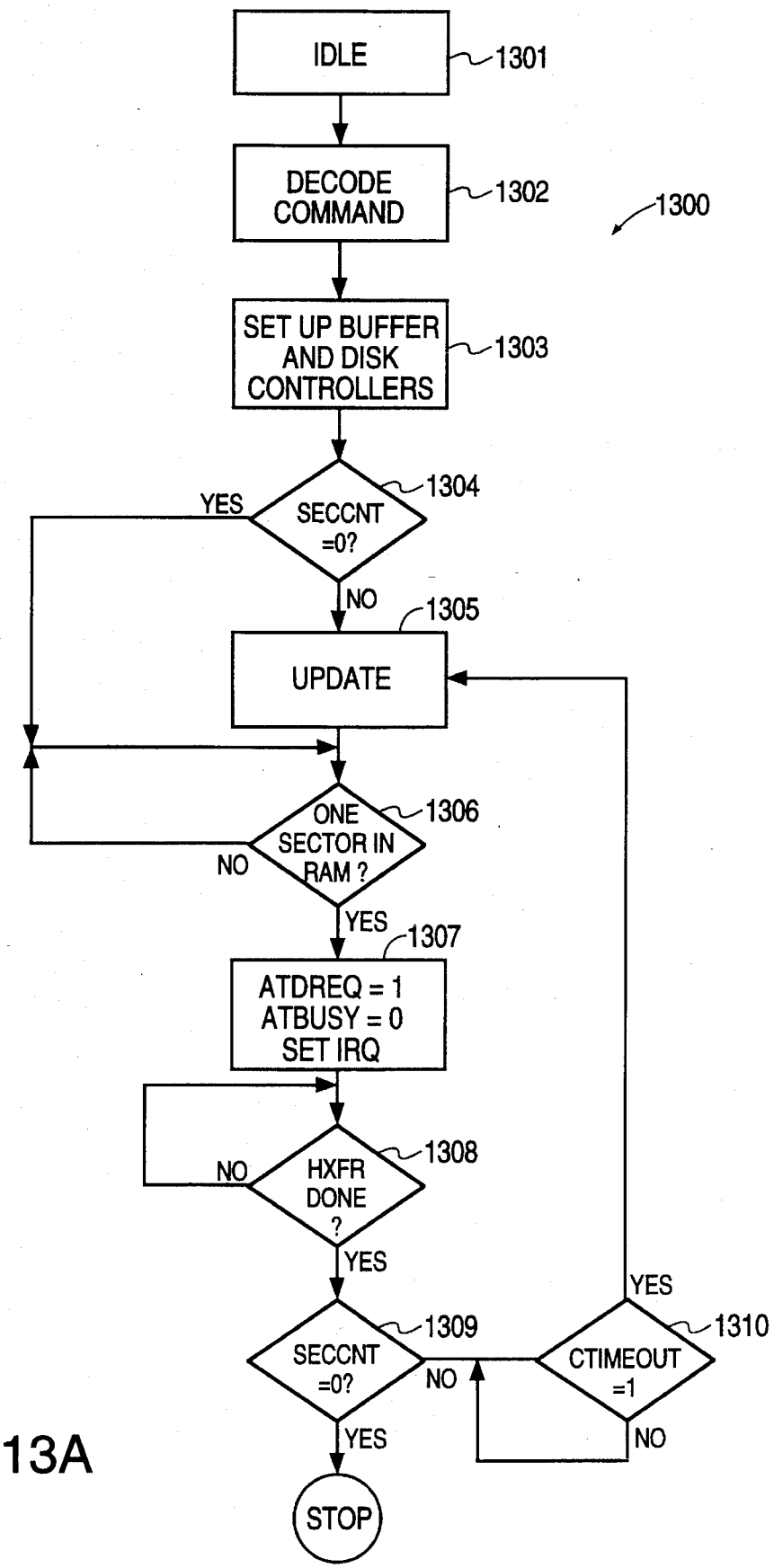
FIG. 13a is a flow diagram of the high level sequence of events in local microprocessor 121 during a host READ operation, under the manual transfer mode.

FIG. 13a is a flow diagram 1300 of the high level sequence of events in microprocessor 121 during a host READ operation under the manual transfer mode. Initially, microprocessor 121 waits in an idle state 1301 for host computer 110 to write a command into the COMMAND register of AT Command block 303. When host computer 110 writes into the COMMAND register a command, which is decoded at state 1302 to be a READ command, microprocessor 121 enters state 1303 to set up buffer controller 133 and disk controller circuit 132 to read the data at the geometric address specified and to transfer the data into RAM 122. If control signal SECCNTEQ0 is set, i.e. the command is a single sector read, microprocessor waits at decision point 1306 until one sector of data is transferred into RAM 122. Alternatively, if the SECCNTEQ0 signal is not set, i.e. the read operation is a multiple sector READ operation, the geometric address in AT Command block 303 is updated to point to the next sector. Then, microprocessor 121 waits at decision point 1306 until one sector of data is available in RAM 122.

When the required sector of data has been transferred into RAM 122, host transfer is allowed to begin. In state 1307, microprocessor 121 sets data request signal ATDREQ, thereby resetting status bit ATBUSY, and sets the host interrupt IRQ signal. Microprocessor 121 then waits at decision point 1308 until one sector of data is transferred to host computer 110. At the end of the host transfer, microprocessor 121 checks if control signal SECCNTEQ0 is set. If so, all sectors of the current command have been transferred, and command execution of the current READ command is complete. Otherwise, microprocessor 121 waits at decision point 1310 for a BUSY timer to time out, to ensure that sufficient time elapses between sector transfers, so as to prevent an error condition. Such an error condition results from host computer 110 inadvertently resetting the next host interrupt when polling the AT STATUS register, which automatically resets the host interrupt IRQ signal. When the BUSY timer times out, microprocessor 121 enters state 1305 to update the geometric address in AT Command block 303 to point to the next sector to be transferred.

Figure 13B:
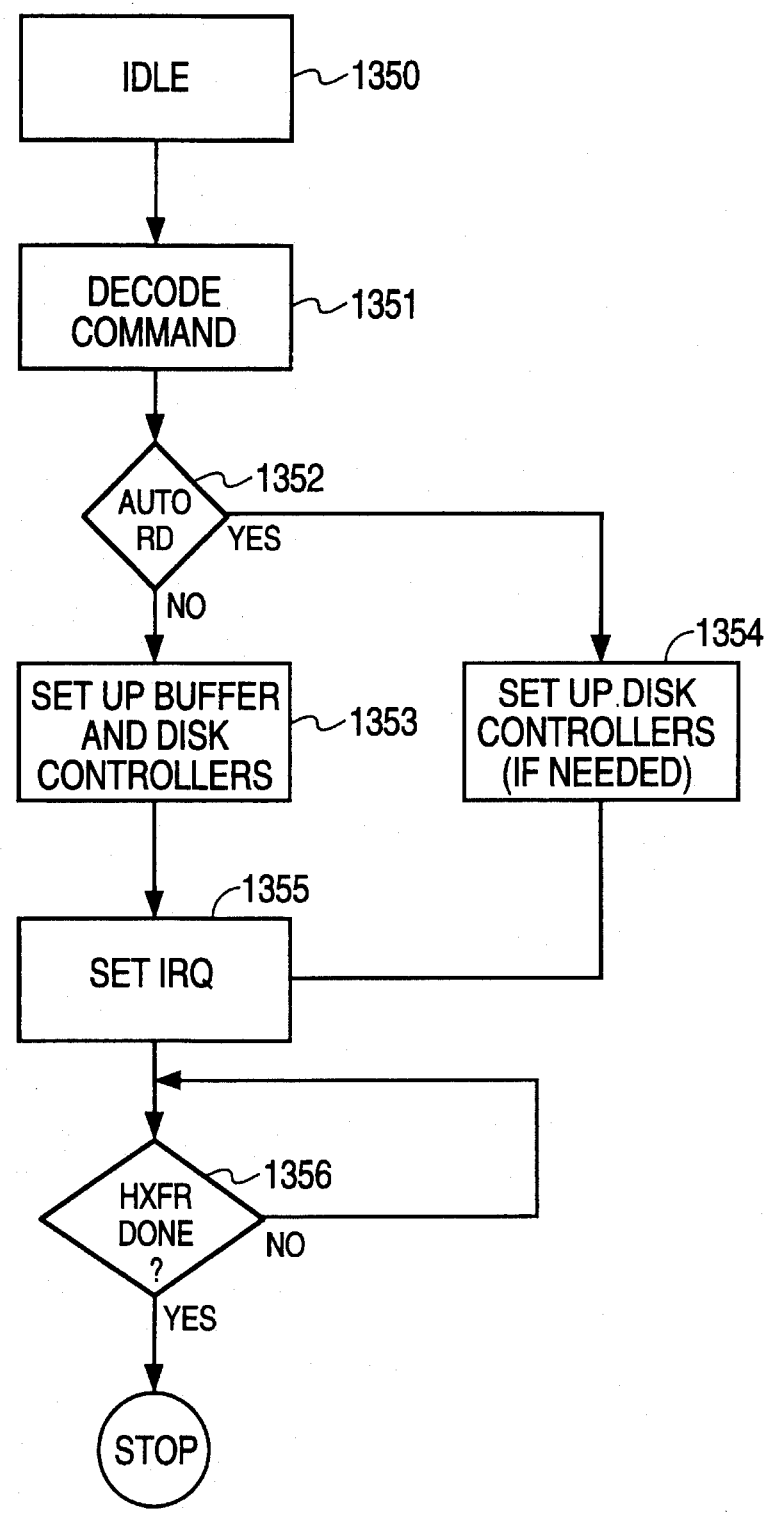
FIG. 13b is a flow diagram of the high level sequence of events in local microprocessor 121 during a host READ operation, under the automatic transfer mode.

FIG. 13b is a flow diagram 1350 showing the high level sequence of events in microprocessor 121 during a host READ operation under the automatic transfer mode. As shown in FIG. 13b, microprocessor 121 waits in state 1350 for host computer 110 to write into the COMMAND register of AT Command block 303. When a READ command is decoded (at state 1351) by Command decoder 306, microprocessor 121 enters state 1354, if the command in the COMMAND register is an Auto READ command; otherwise, microprocessor 121 enters state 1353.

In state 1354, i.e. when executing an Auto READ command, microprocessor 121 sets up disk controller 1354, when a physical access to the physical storage medium is necessary. In state 1353, i.e. when executing a Normal READ command, microprocessor 121 sets up buffer controller 133 and disk controller 132 to perform the access of the requested data. When one sector of data is transferred into RAM 122, microprocessor 121 sets the host interrupt IRQ signal to initiate host transfer and waits until at decision point 1356 all sectors are transferred. When all sectors are transferred, execution of the READ command under the automatic transfer mode is complete.

A detailed description of host interface 234's functional blocks is provided below to illustrate this embodiment of the present invention. The skilled person in the art would, of course, recognized that the specific implementation details, such as the width of the data path, or the use of specific control signals, are for illustrative purposes only and are not to be taken in a limiting sense.

Host Decoder 306

In FIG. 3, local MPU interface 301 generates read and write strobe signals from address bus 351, which is a portion of local bus 136. The read and write strobe signals allows microprocessor 121 to write into and read from various configuration registers, including host control registers 304, local mode or control registers 302, and AT command block 303. Included in the input signals for AT command block 303 are the signals WRCMDBLK-, WRMAXSEC-, WRMAXHEAD-, WRSTSEC-, WRSTCDRVHD-, WRSTCYLLO-, and WRSTCYLHI-, which allow microprocessor 121 to set in AT command block 303 the numbers of sectors and heads configured in the mass storage medium 140, and the starting sector, head and cylinder numbers in a geometric address for a read or write access. In this description, a '-' or 'L' character provided as the last character of a signal name indicates that the signal is an active low signal. In addition, a write strobe signal WRAWSCNT- is sent to a subunit (automatic write sector counter) AWSCTR of R/W state machine 310 to load an initial value of a sector counter used during a write operation under the automatic transfer mode, in accordance with the present invention. Local MPU interface 301 also provides other signals for reading and writing various parameters in other units of AT interface 234. For example, the signals WRIRQTIME- and WRBSYTIME- allow microprocessor 121 to set the durations of an IRQ timer and a BUSY timer in R/W state machine 310.

Host decoder 306 decodes input signals received from host address (HA) bus 377, external chip select signals, and control signals from both host control registers 304 and buffer controller 133. Specifically, host decoder 306 decodes HA[2:0] for the processor input/output (PIO) register accessed. The PIO register accessed can be located in AT command block 303, located in host FIFO 305, a status register (not shown), or a digital input register. Host decoder 306 allows host computer 110 to access these registers by providing enable signals ENCBR, ENFIFO, ENSTAT and ENDIGIN, respectively. When host computer 110 requests a PIO access, host decoder 306 provides a signal HOSTPIOSEL and, when host FIFO 305 is accessed, a signal HOSTFIFOSEL to host wait generation circuit 307 to activate when necessary wait states in host processor 110. Wait states are activated on host processor 110, which polls the output signal IOCHRDY on output lead 374 of host wait generation circuit 307.

When host computer 110 accesses AT command block 303 for writing into a register, host decoder 306 provides a write strobe signal CBWRL. In addition, host decoder 306 receives from host computer 110 read and write strobe signals IORL and IOWL and provides to host FIFO 305 output strobes signals FRDL and FWRL, corresponding to IORL and IOWL respectively, to allow a host transfer to proceed between host FIFO 305 and host computer 110 when a control signal HXFREN ("host transfer enable") from bus controller 133 indicates host FIFO 305 can be accessed by host computer 110.

AT Command Block 303

Figure 4:
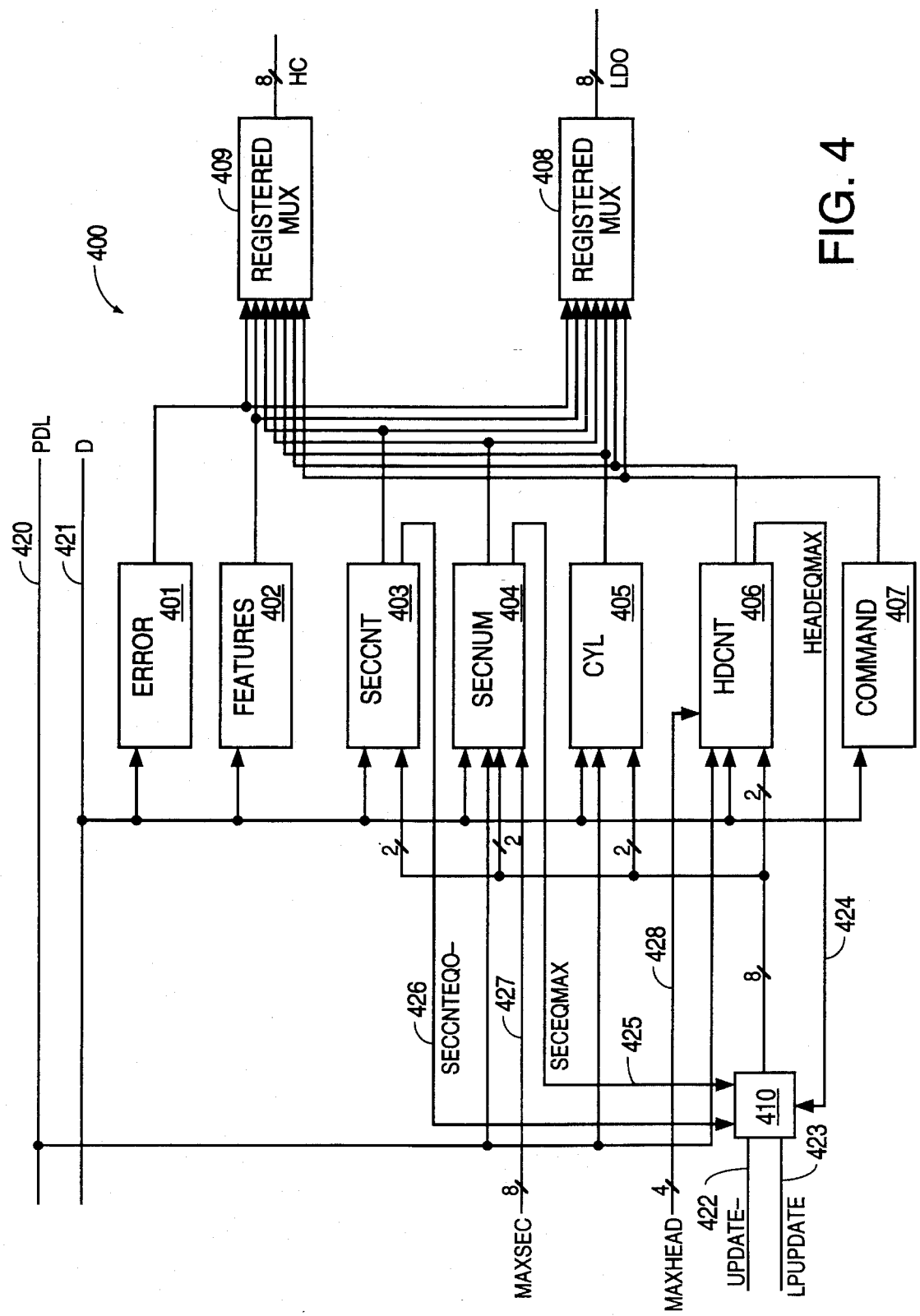
FIG. 4 is a block diagram of register file 400, including the ERROR register 401, FEATURES register 402, SECCNT register 403, SECNUM register 404, CYL register 405, DRVHEAD register 406 and COMMAND register 407.

AT command decoder 303 includes a register file 400 and a command decoder 450 (not shown). (A detailed description of command decoder 450 is omitted, since its construction will be apparent to those skilled in the art. The reference numeral 450 is provided to facilitate reference). AT command block 303 is provided for communication between host computer 110 and either local microprocessor 121, or R/W state machine 310. Register file 400 is shown in FIG. 4. Register file 400 includes ERROR register 401, FEATURES register 402, SECCNT register 403, SECNUM register 404, CYL register 405, which includes two registers CYLL (405a) and CYLH (405b), DRVHEAD register 406 and COMMAND register 407. As shown in FIG. 4, each of registers 401–407 can be loaded from either a "D" bus 421, or a "PDL" bus 420. D bus 421 is the output of multiplexer 452 (not shown), which multiplexes between the signals from local microprocessor bus 136 and host interface bus 115. PDL bus 420 is a latched version of the signals on microprocessor bus 136. Multiplexer 452 multiplexes onto D bus 421 signals from host bus 115, when a host transfer is either in progress, or can arrive at any time. During such time, microprocessor 121 is prevented from writing into registers 402–407 (ERROR register 401 is an exception, being read-only to host processor 110), since valid data can exist in host FIFO 305 at any time. Likewise, the microprocessor and host input address busses LA[2:0] and SA[2:0], respectively, and host and microprocessor input write strobes ATCBWRL and LCBWRL, respectively, are each multiplexed to prevent local microprocessor 121 from writing when the data path is activated. Host computer 110 can read any of registers 401–407 when the status bit ATBUSY is reset. This read restriction is enforced by treating all host accesses, when the status bit ATBUSY is set, as a read access to the AT STATUS register. Local microprocessor 121 can read any of registers 401–407 at any time. The output values of each of registers 401–407 are multiplexed by multiplexers 409 and 408 onto host and microprocessor data buses 358 and 351 respectively.

ERROR register 401, FEATURES register 402 and COMMAND register 407 are single registers. COMMAND register 407 holds the current command in AT Interface 234. When host computer 110 writes into COMMAND register 407, control signal BUSY is set. BUSY is not set when microprocessor 121 writes to COMMAND register 407. Each command written into COMMAND register 407 is decoded by command decoder 450, which loads the decoded information into the appropriate control registers. FEATURES register 402 holds command-specific information, which is used to enable and disable features of AT interface 234. ERROR register 401 holds any error condition, such as "bad block detected" or "media change requested", detected during the execution of a command.

Figure 5:
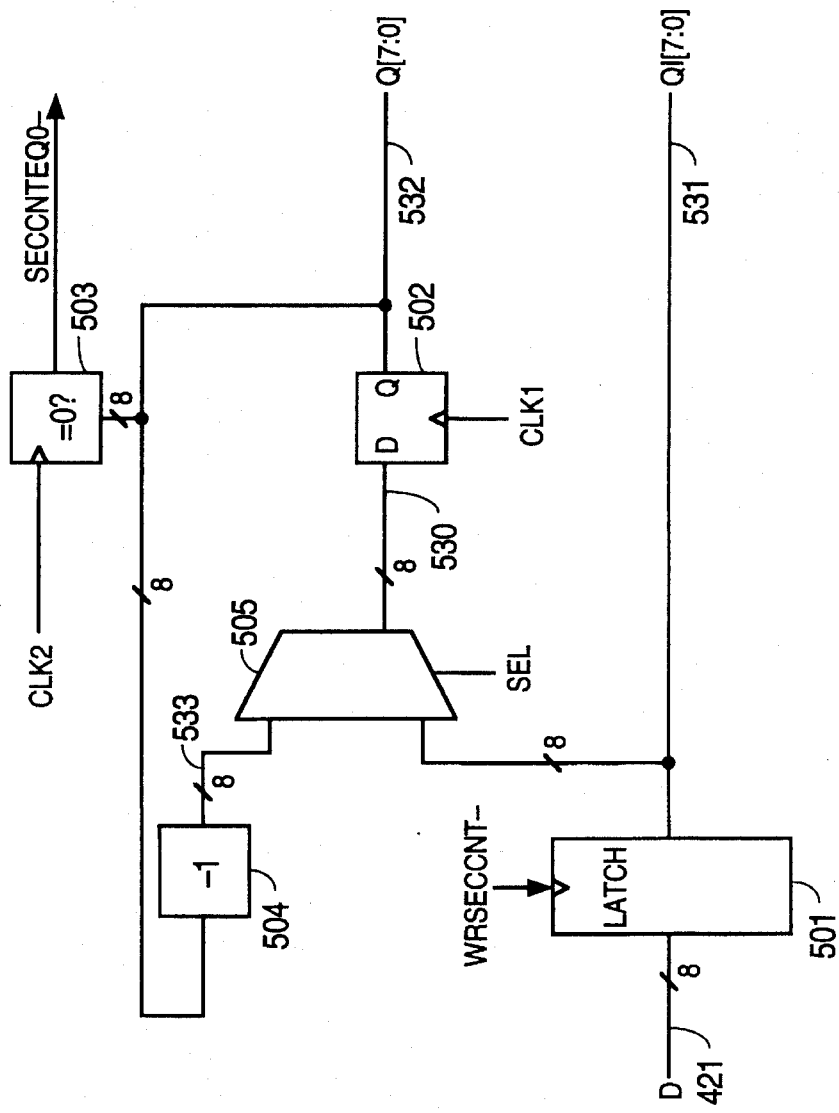
FIG. 5 is a block diagram of an implementation 500 of SECCNT register 403.
Figure 5:
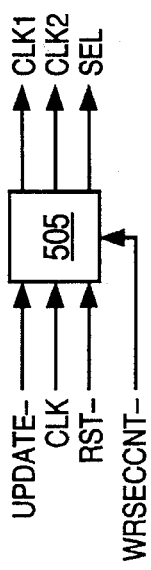

SECCNT register 403 is a counter/register combination. In this arrangement, both the counter ("working counter") and register ("image register") portions of SECCNT register 403 are initially loaded with the number of sectors to transfer specified in the command. As sectors are transferred, the working counter is decremented, in accordance with control signal LPUPDATE (from microprocessor 121), or control signal DECRESECCNT- (from R/W state machine 310), to indicate the number of remaining sectors to transfer under the current command, while the image register keeps the initial value. FIG. 5, discussed below, is a block diagram of an implementation 500 of SECCNT register 403. A zero detector circuit in SECCNT register 403 provides control signal SECCNTEQ0-, which is active when the value in the working counter becomes zero.

SECNUM register 404, CYL register 405, and DRVHEAD register 406 are registers for storing the geometric address of a transfer. A geometric address is a combination including a sector number, a cylinder number, and a head number. Each of registers 404–406 include a counter/counter/register combination. The two counters of each of SECNUM, CYL and DRVHEAD registers 404–406 are known as "working" and "start" counters, respectively. The register portion of each of registers 404–406 is known as the "image register". As sectors are transferred, both the working counter and the start counter in each of registers 404 and 406 are simultaneous incremented, except when the sector count in the working counter of SECCNT register 403 is zero. When the sector count in SECCNT register 403 is zero, corresponding to completion of the current command, only the start counters in registers 404 and 405 are incremented. Of course, in accordance with the structure of a geometric address under the CHS (cylinder-head-sector) mode, the appropriate condition for incrementing the working and start counters of DRVHEAD register 406 is when the highest sector number is reached. Similarly, the appropriate condition for incrementing the cylinder number is when both the highest head number and the highest sector number are reached. Thus, the contents of working counters in SECNUM register 404 and DRVHEAD register 406 are compared in comparators internal to register 404 and 406 to the maximum sector number (MAXSEC, on bus 428) and the maximum head number (MAXHEAD, on bus 428), respectively to detect these "wrap" conditions. When equality is achieved in each of these comparisons, the corresponding control signal SECEQMAX or HEADEQMAX is set.

Using this counter/counter/register combination, an efficient read ahead scheme can be accomplished. In a disk drive, the seek time, i.e. the time delay incurred in positioning the servo mechanism to reach the desired track to or from which data is to be transferred, is a significant portion of the access time. Thus, the present invention allows allocating in buffer 122 room for reading ahead a programmable number of sectors to be read per access of the physical storage medium into RAM 122.

As the transfer of each sector or block to host computer 110 completes, the start counters of SECNUM register 404, CYL register 405 and DRVHEAD register 406 are each incremented, so that the geometric address points to the next sector cached in RAM 122. The Auto READ command reads from RAM 122 this cached sector previously set up by the start counters. Consequently, when the geometric address submitted for a read operation matches that geometric address stored in the start counters of register 404–406, the requested sectors are practically immediately available without an actual access to the physical storage medium.

Incrementing the start and working counters are controlled by control signal LPUPDATE (line 423, from microprocessor 121), or control signal UPDATE- (line 422, from R/W state machine 310). Logic circuit 410 receives the control signals SECEQMAX, HEADEQMAX, SECCNTEQ0-, UPDATE-, and LPUPDATE to generate the appropriate update signals (UPDATE- and UPDATELAST-) to each of registers 403–406.

For the read sector (READ Sectors), read block (READ Multiple), auto read sector (Auto READ Sectors) and Auto read blocks (Auto READ Multiple) commands, the status bit ATBUSY is automatically cleared when a transfer is complete (i.e. SECCNT=0).

FIG. 5 shows an implementation 500 of SECCNT register 403. As shown in FIG. 5, an 8-bit transparent latch 501, which serves as an image register, is loaded from D bus 421 when the control signal WRSECCNT- is active. The output value of latch 501 is provided on bus 531. Simultaneously, control signal SEL directs multiplexer 505 to select the value on bus 531 as its output value on bus 530. When the value on bus 531 is not selected, the 8-bit output value on bus 533 of decrementer circuit 504 is selected.

An 8-bit register 502 is clocked by control signal CLK1 to receive the value on bus 530 while WRSECCNT- is active. When control signals WRSECCNT- and UPDATE- are asserted, CLK1 is active and synchronous with input clock signal CLK to latch into register 502 the value on bus 530. The output value of register 502 is provided on bus 532 as the "working count". After the initial value is loaded into register 502 when control signal WRSECCNT- is active, each subsequent active pulse of control signal UPDATE- latches into register 502 a decremented value, which is provided by decrementer circuit 504 computing from the immediately previous value on bus 532. Thus, the data path including register 502, decrementer circuit 504 and multiplexer 505 forms a working counter.

A clocked (CLK2) zero detector circuit 503 provides a control signal SECCNTEQ0-, when the value on bus 532 is zero. Control signal SECCNTEQ0- is synchronously updated with respect to clock signal CLK, when either of the control signals WRSECCNT- and UPDATE- is active.

In FIG. 5, control signal generation circuit 505 provides control signals CLK1, CLK2 and SEL for controlling register 502, zero detector circuit 503 and multiplexer 505 respectively.

Figure 6:
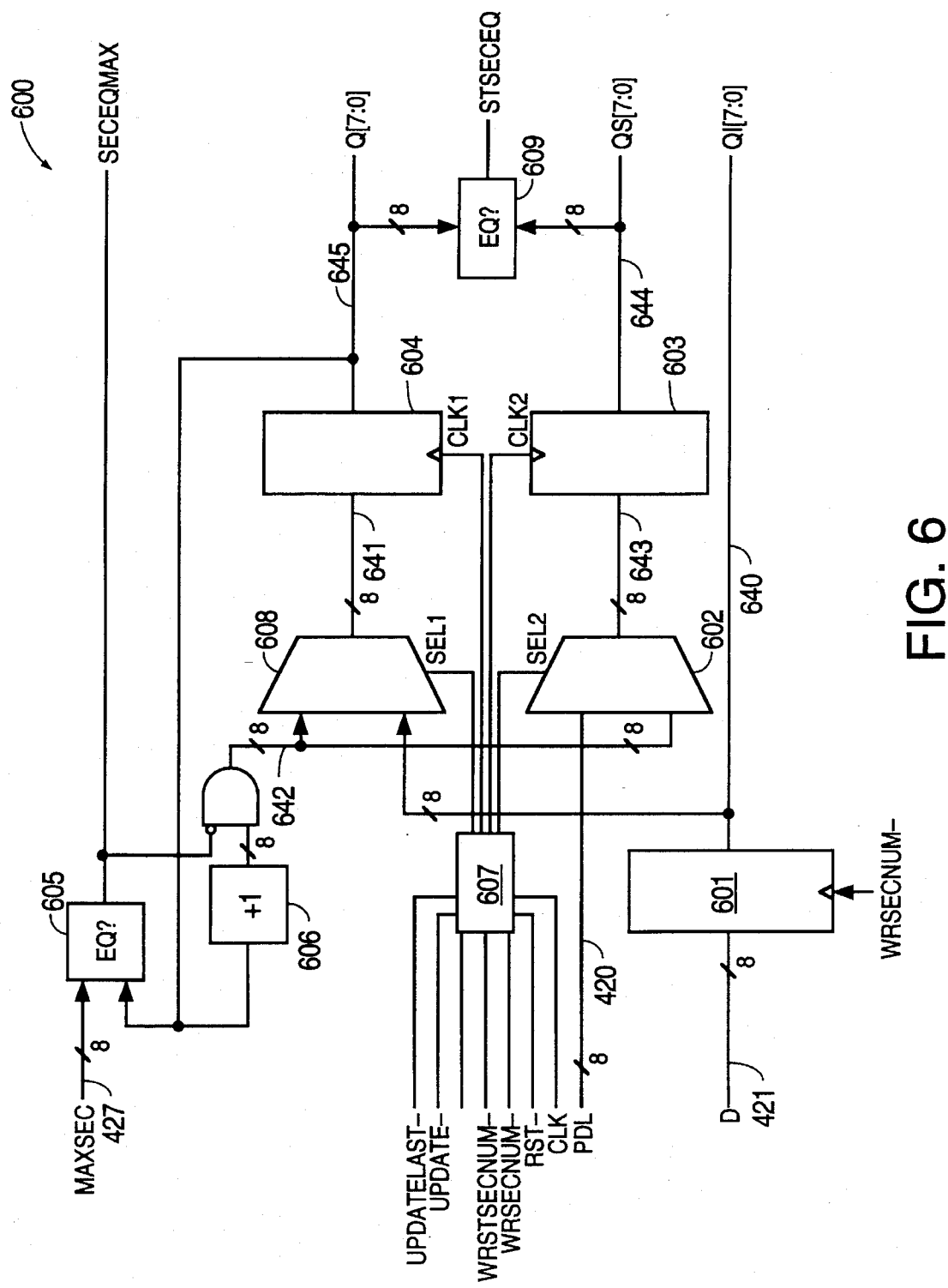
FIG. 6 is a block diagram of an implementation 600 of SECNUM register 404.

FIG. 6 shows an implementation 600 of SECNUM register 404. As shown in FIG. 6, 8-bit transparent latch 601, which serves as an image register, receives from D bus 421 the starting sector number of a transfer when the write strobe signal WRSECNUM- is active. The output value of latch 601 is made available on bus 640. Simultaneously, synchronously with input clock signal CLK, control signal SEL1 is set such that multiplexer 608 selects the value on bus 640 as its output value on bus 641. Control signal SEL1 selects the value on bus 640 when write strobe signal WRSECNUM- is active, and selects the output value on bus 642 otherwise. The output value on bus 641 of multiplexer 608 is latched into register 604 and provided on bus 645 as the initial "working count", when clock signal CK1 is active. CK1 is active, synchronously with input clock signal CLK, whenever either of the control signals WRSECNUM- and UPDATE- is active. Thus, initially, register 604 latches the starting sector number.

In FIG. 6, when the write strobe signal WRSTSECNUM- is active, control signal SEL2 directs multiplexer 602 to select the value on bus 420 (bus 420 is a portion of microprocessor data bus 351), and control signal CK2, which is synchronous with input clock signal CLK, latches this selected value from bus 643 into register 603. Register 603 serves as a start counter for SECCNUM register 404. Control signal CK2 is active whenever either of the control signals UPDATE- and UPDATELAST- is active. Register 603 provides an output value on bus 644, which is compared by comparator 609 to the working count on bus 645 to generate a control signal STSECEQ. STSECEQ is set when the values on busses 644 and 645 are equal.

The working count on bus 645 is incremented by incrementer 606. Comparator 605 compares the value of the working count on bus 645 with the maximum sector number (MAXSEC) to generate a control signal SECEQMAX, and resets the output of incrementer 606 to one when MAXSEC is reached. The incremented value is provided on bus 642 selected by both multiplexers 608 and 602 in accordance with their respective control signals SEL1 and SEL2. Both registers 604 and 603 receive the incremented value when control signal UPDATE- is active, and register 603 receives the incremented value when control signal UPDATELAST- is active. Thus, the data paths including registers 603 and 604, comparator 605, incrementer circuit 606, and multiplexers 608 and 602 form the working and start counters of SECNUM register 404.

In FIG. 6, the control signals SEL1, SEL2, CK1, CK2 are generated by logic circuit 607, which receives as input write strobe signals WRSTSECNUM-, WRSECNUM, input clock signal CLK, and update signals UPDATE- and UPDATELAST-.

Figure 7:
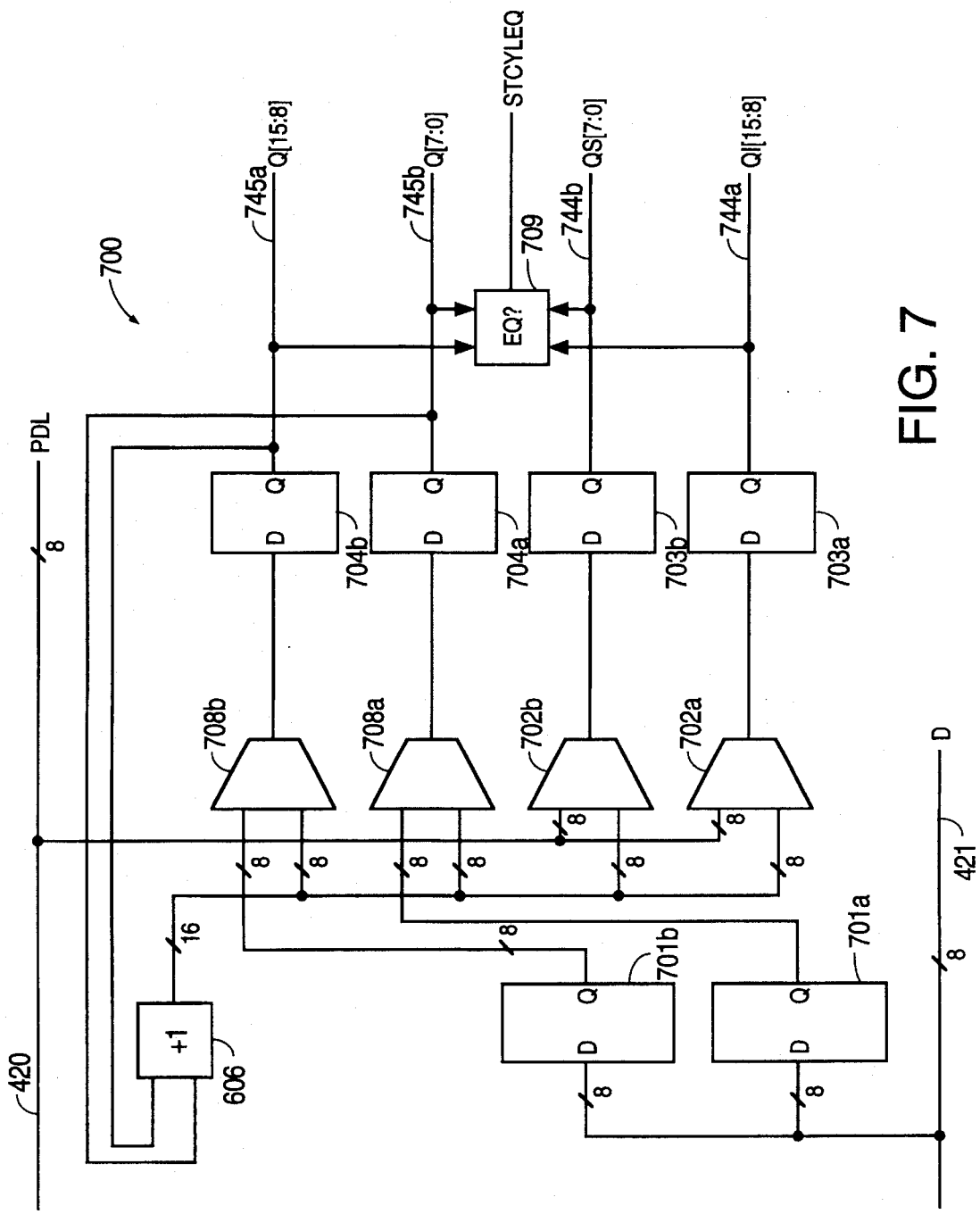
FIG. 7 is a block diagram of an implementation 700 of CYL register 405.

FIG. 7 shows an implementation 700 of CYL register 405. In principle, implementation 700 is a 16-bit version of the circuit which is used as implementation 600 of SECNUM register 404, with the exception that since there is no "wrap around" for the highest cylinder number reached, a comparator in implementation 700 corresponding to comparator 605 of implementation 600 is not provided. Since one of ordinary skill would be able to appreciate implementation 700 by extension from the detailed description of implementation 600 above, only a brief description for implementation 700 is provided.

In FIG. 7, registers 701a and 701b form a 16-bit image register similar to 8-bit image register 601 of FIG. 6. Registers 703a and 703b, which provides a 16-bit start count on busses 744a and 744b combined, form a 16-bit register similar to register 603 of FIG. 6. Registers 704a and 704b, which provides a working count on busses 745a and 745b combined, form a 16-bit register similar to register 603 of FIG. 6. The working and start counters are formed by the data paths including the registers 704a, 704b, 703a and 703b, incrementer 606, and multiplexers 702a, 702b, 708a and 708b. A control signal indicating a match between the start count and the working count is provided by comparator 709 as control signal STCYLEQ. The control signals necessary to control registers 703a, 703b, 704a and 704b and multiplexers 702a, 702b, 708a and 708b are generated by a logic circuit 707 (not shown) which is substantially similar to logic circuit 606 of FIG. 6.

Figure 8:
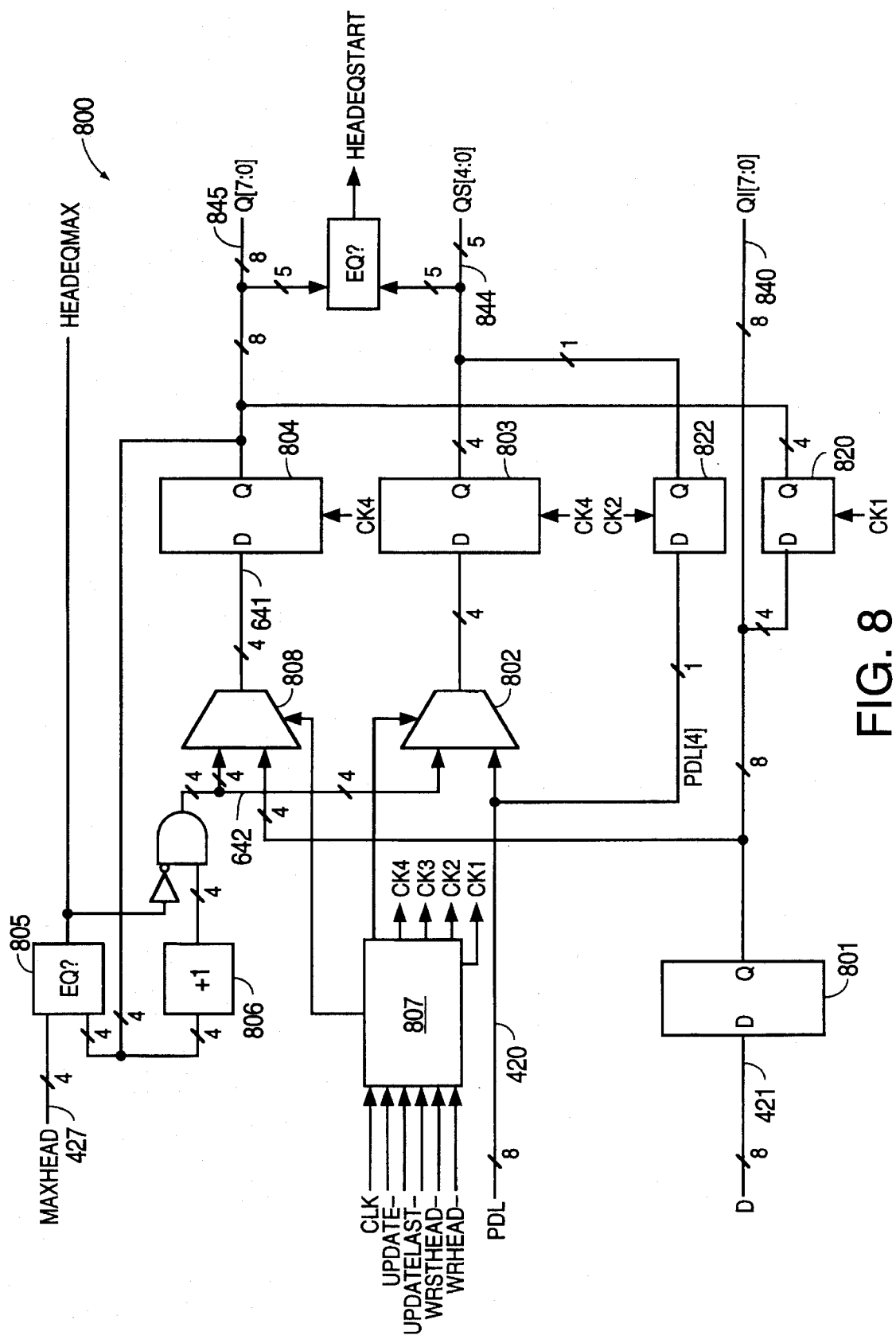
FIG. 8 is a block diagram of an implementation 800 of DRVHEAD register 406.

FIG. 8 shows an implementation 800 of DRVHEAD register 406. In principle, implementation 800 is a 4-bit version of the circuit which is used as implementation 600 of SECNUM register 404, with the following exceptions: (i) an 8-bit image register is provided; (ii) an 8-bit working count is provided; and (iii) a 5-bit comparator provides a control signal HEADEQSTART, which is set when the initial working count matches value in the start counter. The 5-bit comparator compares the head number (bit 3:0) and the drive number (bit 4) of the start counter to the corresponding bits in the working counter. Since one of ordinary skill would be able to appreciate implementation 800 by extension from the detailed description of implementation 600 above, only a brief description for implementation 800 is provided.

In FIG. 8, registers 801 is a 8-bit image register similar to 8-bit image register 601 of FIG. 6. Register 803, which provides the lower four bits of the start count on 5-bit bus 844, is a 4-bit register similar to register 603 of FIG. 6. Register 704, which provides the lower order four bits of an 8-bit working count on bus 845, is a 4-bit register similar to register 603 of FIG. 6. The working and start counters are formed by the data paths including registers 804 and 803, incrementer 806, comparator 805 and multiplexers 802 and 808. A control signal indicating a match between the lower order five bits of the start count on bus 844 and the working count on bus 845 is provided by comparator 809 as control signal HEADEQSTART. To provide an 8-bit output value of the working register, implementation 800 uses the higher order four bits of the image register 801 as the higher order four bits of 8-bit bus 845, after synchronization at 4-bit register 820. Likewise, bit 4 of bus 420 is used, after synchronization at 1-bit register 822, as bit 5 of bus 844.

The control signals necessary to control registers 803, 804, 820 and 822, and multiplexers 802 and 708 are generated by logic circuit 807, which is substantially similar to logic circuit 606 of FIG. 6.

Command decoder 450 (not shown) includes a combinational logic decoder which receives as input the 8-bit command in COMMAND register 407. The output signals of this combinational logic decoder are latched in transparent latches. In addition to the command in COMMAND register 407, the input signals received by command decoder 450 include:

| Signal | Description |
| --- | --- |
| AUTORDMATCH | an active high signal indicating that the values in all start counters match their corresponding values in the working counters. |
| ENAUTORDMA | an active high signal indicating the |

| Signal | Description |
|---|---|
| | "Auto Read DMA" commands are enabled. |
| ENAUTOWDMA | an active high signal indicating the "Auto Write DMA" commands are enabled. |
| ENAUTORDM | an active high signal indicating the "Auto Read Multiple" commands are enabled. |
| ENAUTOWR | an active high signal indicating the "Auto write sectors" commands are enabled. |
| ENAUTORD | an active high signal indicating the "Auto read sectors" commands are enabled. |
| HOSTWRCMD- | an active low strobe signal which indicates host computer 110 writing into COMMAND register 407. |
| WRCMD- | an active low signal which becomes active when COMMAND register 407 is written, regardless of whether host 110 or microprocessor 121 originates the read access to COMMAND register 407. |

The output signals of command decoder 450 include:

| Signal | Description |
|---|---|
| AUTOWRCMD | an active high signal which is set when either of the enable signals ENAUTO and ENAUTOWRM are set, and an AUTO write command is written into COMMAND register 407. AUTOWRCMD is used to start the R/W state machine 310 described below. |
| AUTORDCMD | an active high signal which is set when AUTORDMATCH is set, either one of the enable signals ENAUTORD and ENAUTORDM is set, and an AUTO read command is written into COMMAND register 407. AUTORDCMD is used to start the R/W state machine described below. |
| RWMUTLICMD | an active high signal which is set when a Read or Write Multiple command is written into COMMAND register 407. RWMULTICMD is read by buffer controller to determine whether the control signal HSECADONE, which indicates completion of transfer of a sector or block should be issued on a per sector or a per block basis. |
| SETATBUSYL | an active low strobe signal which is generated after host computer 110 loads COMMAND register 407. This SETABUSYL is used to generate the status bit ATBUSY discussed above. |
| SETAUTOWR- | an active low strobe signal indicating a Auto Write command is loaded into COMMAND register 407. SETAUTOWR- places buffer controller 133 into write mode and initiates a transfer without intervention by microprocessor 121. |
| SETAUTORD- | an active low strobe signal indicating a Auto Read command is loaded into COMMAND register 407. SETAUTORD- places buffer controller 13 into read mode and |

| Signal | Description |
|---|---|
| | initiates a transfer without intervention by microprocessor 121. |
| ATCMDRWL | an active low signal which is sent when host computer 110 writes into COMMAND register 407. ATCMDRWL is used to reset control signals throughout integrated circuit 230 prior to execution of the current command in COMMAND register 407. |

Host FIFO 305

Figure 9:
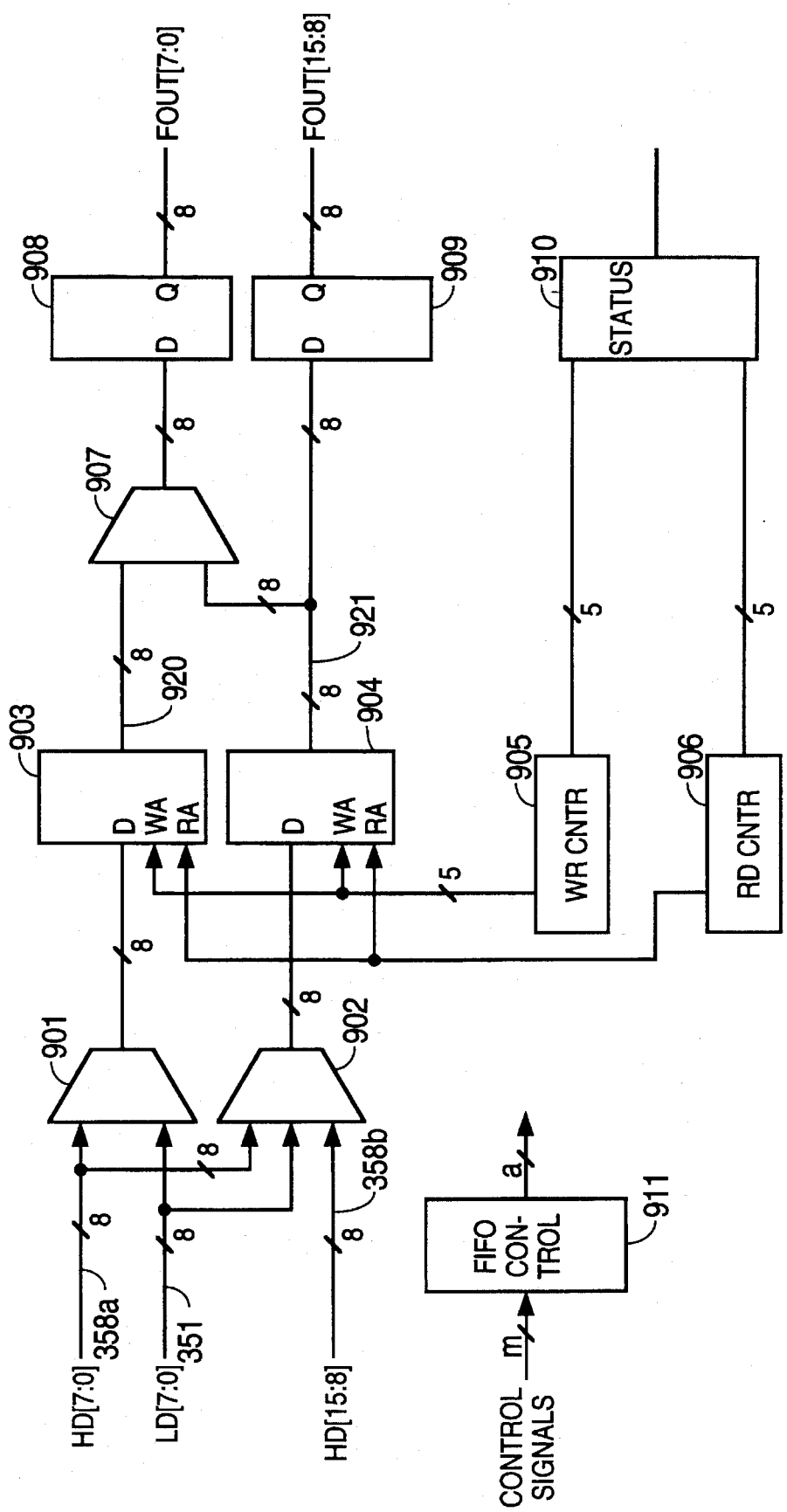
FIG. 9 is a block diagram of an implementation 900 of host FIFO 305.

Host FIFO 305 can be configured as either an 8-bit wide FIFO memory or a 16-bit wide FIFO memory. FIG. 9 is a block diagram of an implementation 900 of host FIFO 305. As shown in FIG. 9, under 16-bit mode, host FIFO receives the full 16 bits of data from host data bus 358, which is shown in FIG. 9 as two 8-bit busses 358a and 358b. Host FIFO can also be loaded by local microprocessor 121 from 8-bit bus 351. Two multiplexers 901 and 902 steer the input data into two banks 903 and 904 of random access memories (RAMs). Banks 903 and 904 are each 8-bit wide, such that, during 16-bit mode, corresponding words in banks 903 and 904 form the higher and lower order eight bits of a 16-bit word. Alternatively, under 8-bit mode, each word in banks 903 and 904 stores an 8-bit word. Banks 903 and 904 provide 8-bit output values on busses 920 and 921 respectively; these 8-bit output values are provided as input data to output registers 908 and 909. Under 8-bit mode, the output value on bus 921 is steered to output register 908. Alternatively, under 16-bit mode, output registers 908 and 909 form a 16-bit output register.

Figures 1, 10A:
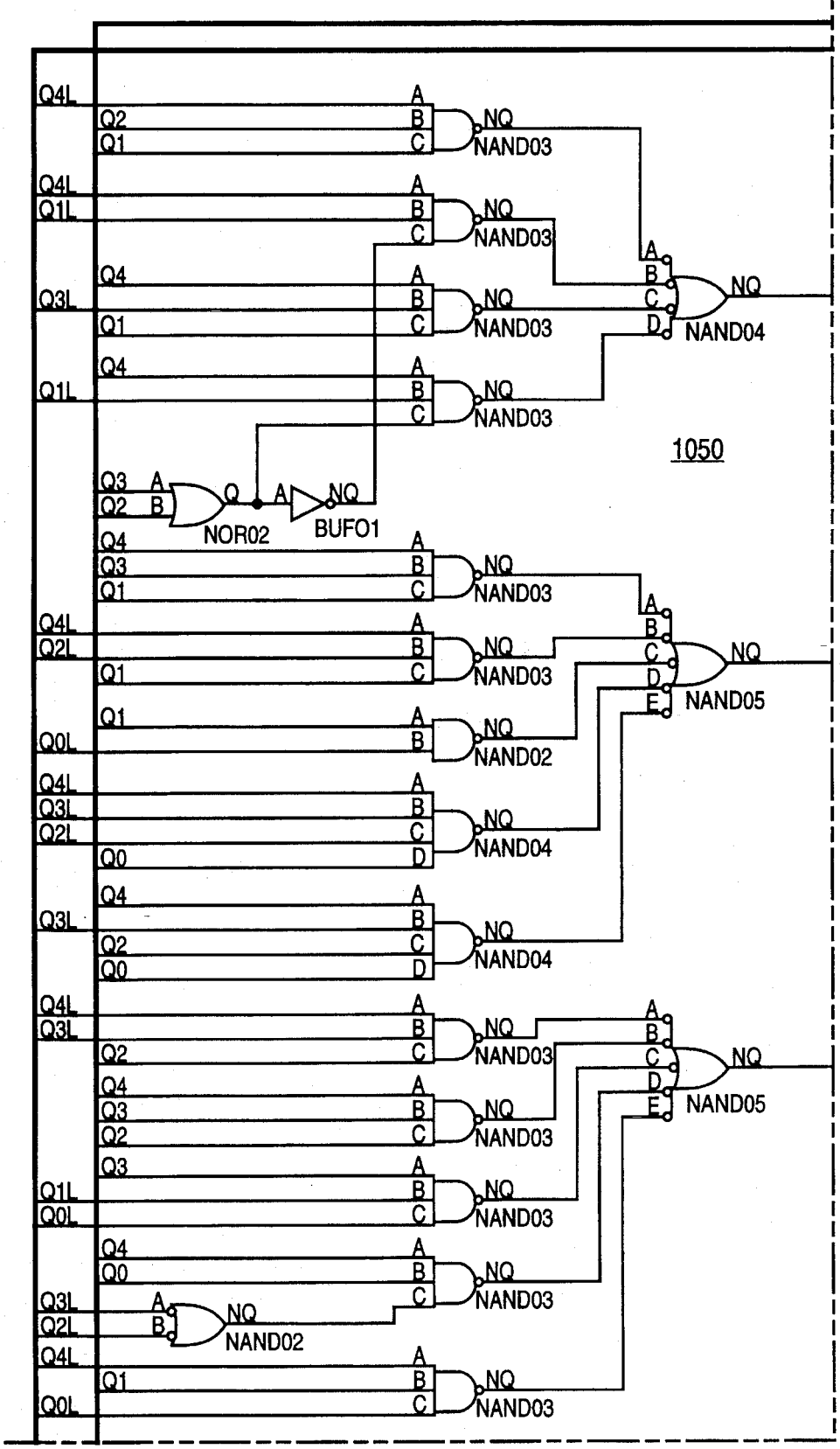
FIG. 10a is a schematic diagram of a circuit 1000, which can be used as a 5-bit counter for either write counter 905 or read counter 906 of FIG. 9.
Figures 2, 10A:
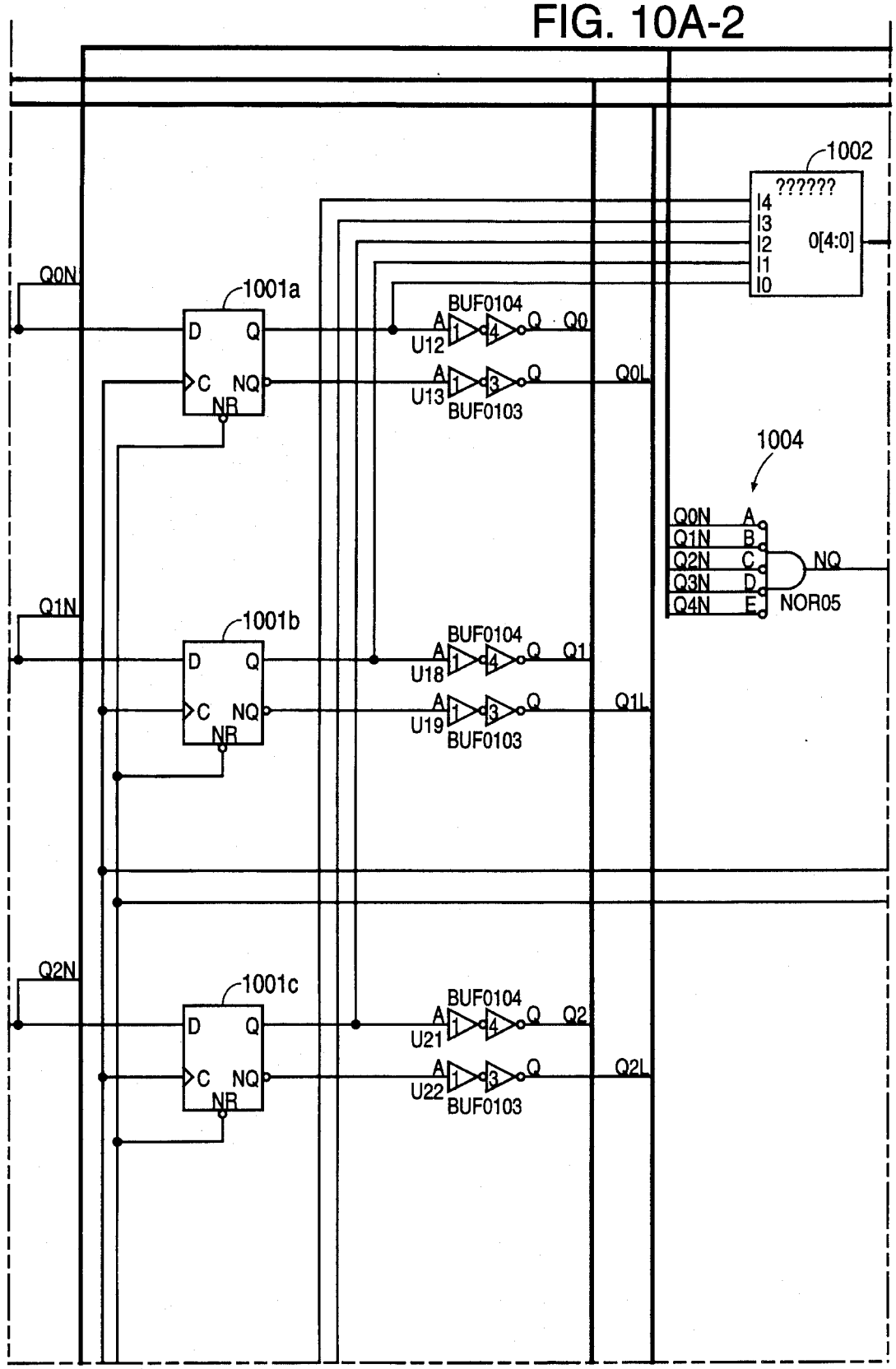
Figures 3, 10A:
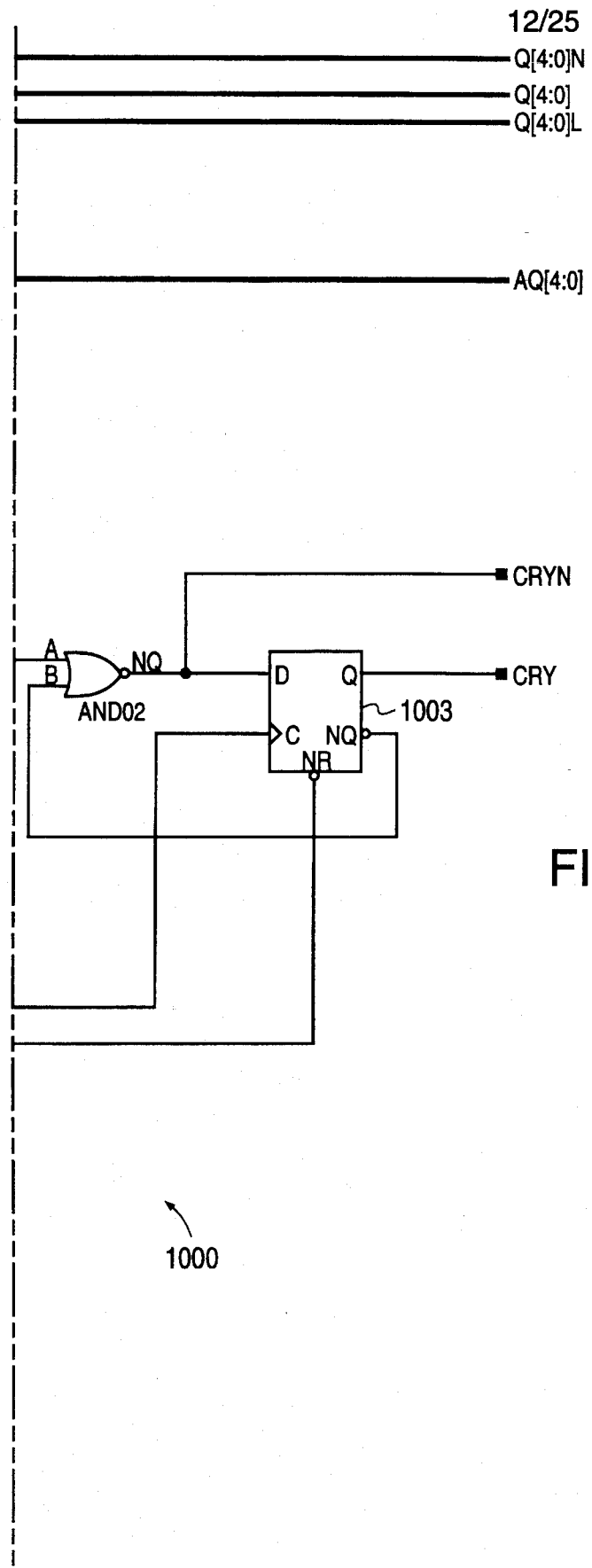
Figures 4, 10A:
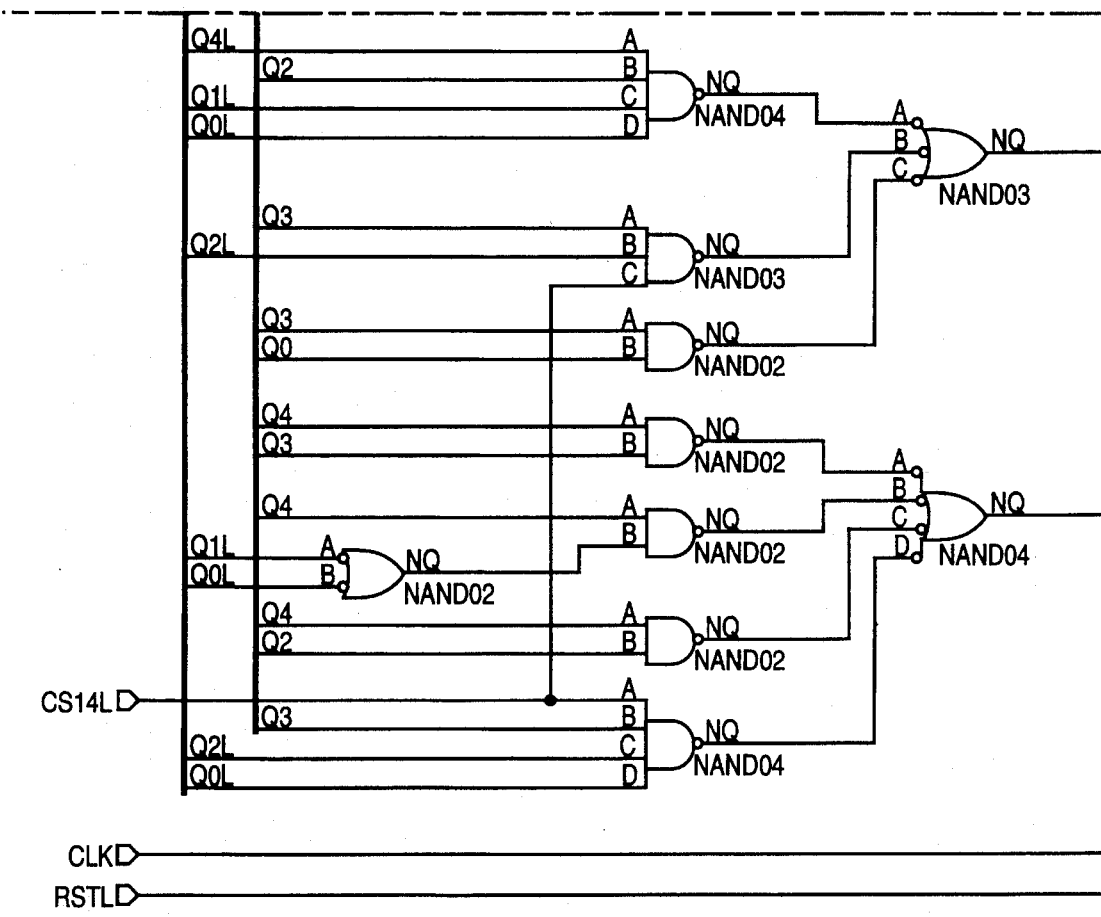
Figures 5, 10A:
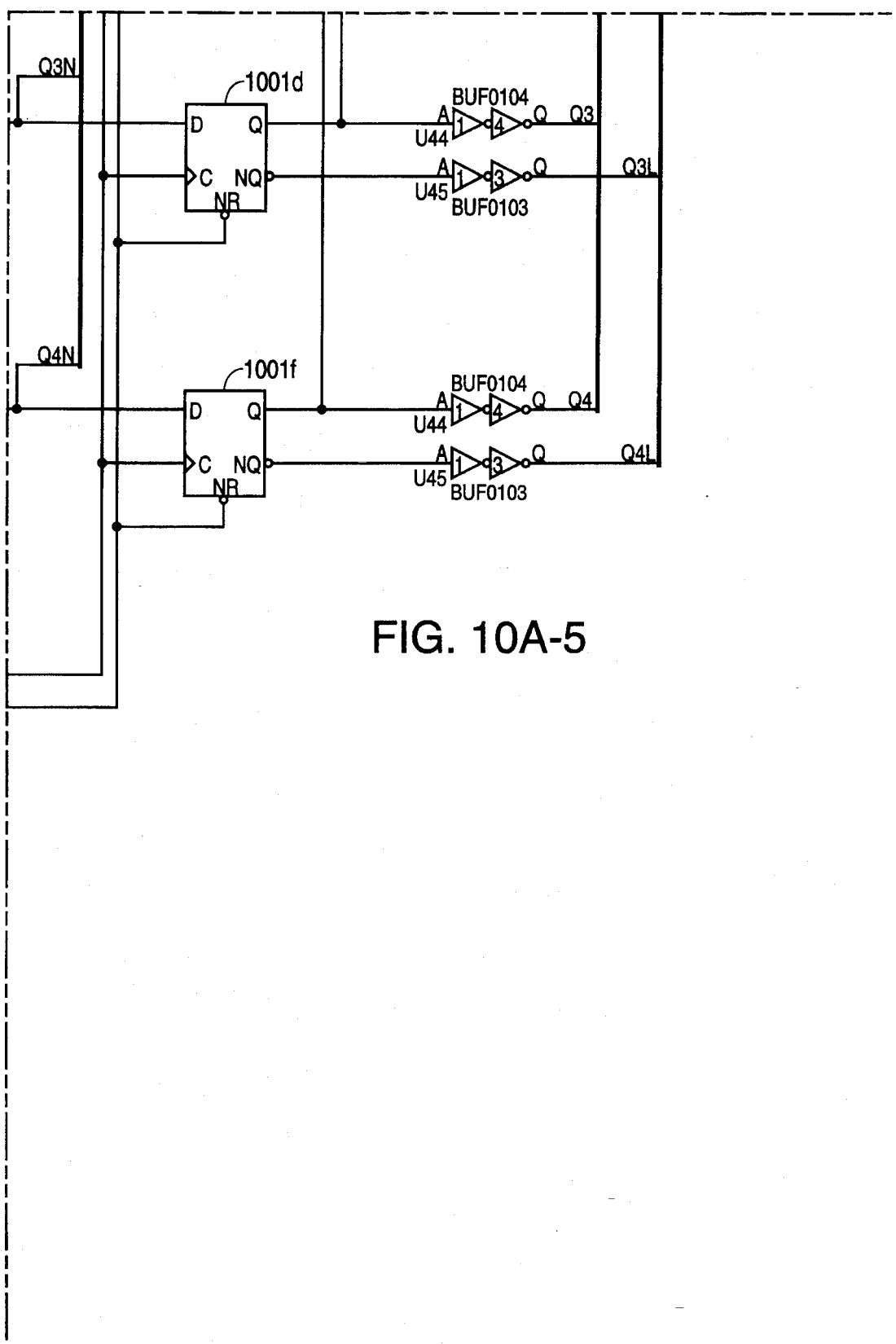

The read and write addresses for banks 903 and 904 are generated by read counter 906 and write counter 905 respectively. Since host FIFO 305 is asynchronous with respect to host computer 110 and the status signals (described below) must be glitch free, counters 903 and 904 do not count in a binary fashion. Rather, the output value of each of counters 905 and 906 count in a manner such that each output value differs from the immediately preceding output value in no more than a single bit position. FIG. 10a shows a circuit 1000 which can be used for either write counter 905 or read counter 906. In circuit 1000, the combinational logic 1050 receives the negated output QL[4:0] to generate the next count, which is latched into flip-flops 1001a–1001f. A zero detector 1004 provides a control signal CRY ("carry") which serves as a "wrap value" to denote the beginning of the next count cycle.

As shown in FIG. 10a, circuit count in the following manner (in hexadecimal):

Under 16-bit mode: 0, 1, 3, 2, 6, 7, 5, 4, C, D, 9, 8, 0, . . .

Under 8-bit mode: 0, 1, 3, 2, 6, 7, 5, 4, C, D, 9, 8, 18, 19, 1D, 1C, 14, 15, 17, 16, 12, 13, 11, 10, 0, . . .

Figure 10B:
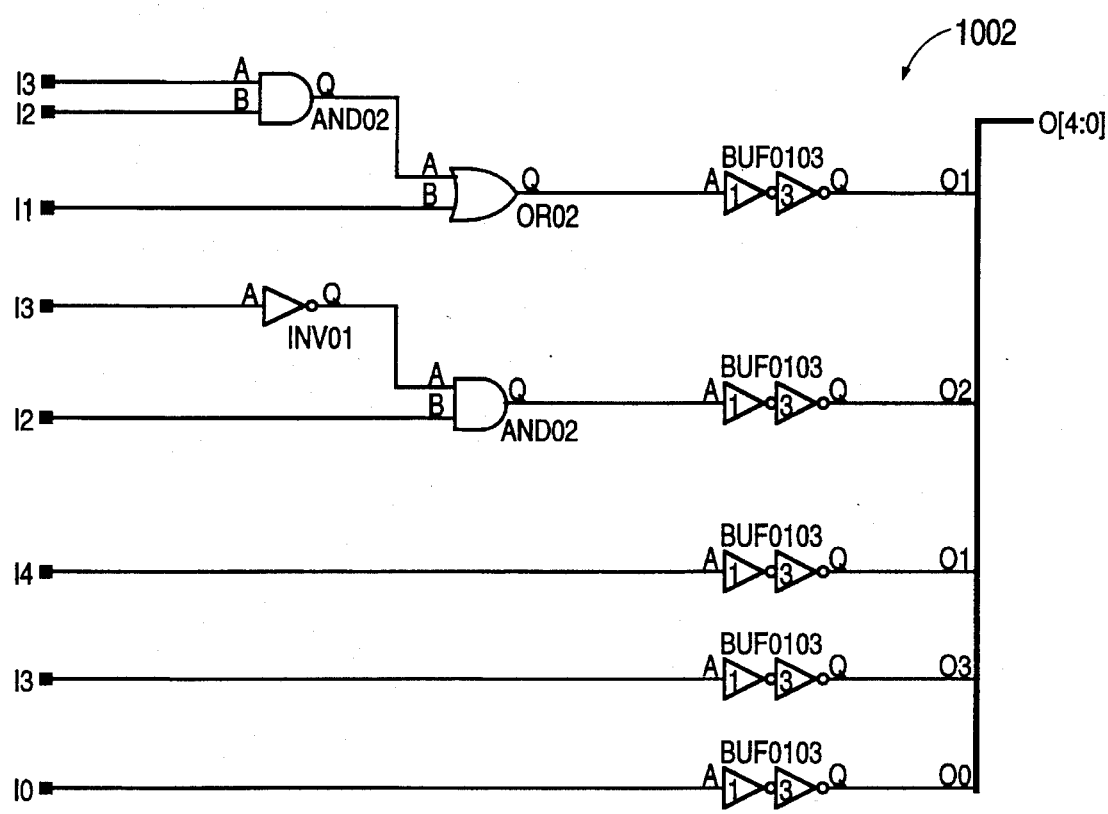
FIG. 10b is a schematic diagram which modifies the 5-bit output value of circuit 1000 to address a 12-word memory.

The control signal CS16L resets the count after '8' under 16-bit mode. In implementation 900 of FIFO 305 shown in FIG. 9, only 12 8-bit locations of RAM are provided in each of banks 903 and 904. Since C, D and 1C, and 1D are values beyond the linear address boundaries of banks 903 and 904, the values C, D, 1C and 1D are respectively remapped to A, B, 1A and 1B by circuit 1002, and are provided in modified output bus AQ[4:0]. A, B, 1A and 1B are not counts in the count sequence of read and write counter 906 and 905. This modified output value is provided to banks 903 and 904, since the address input of banks 903 and 904 need not be concerned with glitch-free performance. Circuit 1002 is shown in further detail in FIG. 10b. The present invention is, of course, not limited by the design of read and write counters 905 and 906.

FIFO control circuit 911 (FIG. 9) generates the read and write strobe signals to banks 903 and 904, and address counters 905 and 906. The input signals of FIFO control circuit 911 include:

| Signal | Description |
| --- | --- |
| STARTXFR- | an active low pulse generated when a new sector/block transfer is initiated. |
| BACK | an active high strobe signal from buffer controller 133, indicating that transfer between buffer and host FIFO 305 can proceed. BACK is generated earlier in time than BXFR (discussed below) in a read access of RAM 122. |
| BXFR | an active high strobe signal from buffer controller 133, indicating data transfer between host FIFO 305 and RAM 122. BXFR, which is used to generate write strobe signal in write access to RAM 122, is the same signal as negated BACK in a write access to RAM 122, and is two clock cycles delayed in a read access to RAM 122. |
| HXFR | an active high strobe signal that indicates transfer between host FIFO 305 and host computer 110. HXFR follows transitions of the host write strobe signals IOW- and IOR-. HXFR is used to generate the read and write. strobe signals to bank 903 and 904. |
| WROP | an active high signal indicating data transfer from RAM 122 to host FIFO 305. |
| RDOP | an active high signal indicating data transfer from host FIFO 305 to RAM 122. |

The output signals generated by FIFO control circuit 911 includes:

| Signal | Description |
| --- | --- |
| WE0 | an active high strobe signal for bank 904. |
| WE1 | an active high strobe signal for bank 903. |
| WRSTBL | an active low write strobe signal used to increment write counter 905 on the trailing low to high transition. |
| RDSTB | an active low read signal used to increment read counter 906 on the leading low to high transition. |
| DATASTB | an active high strobe signal for latching the output data from banks 903 and 904 into registers 908 and 909. |

Status circuit 910 monitors data in banks 903 and 904 to provide status signals to both buffer controller 133 and host computer 110. Synchronous and asynchronous FIFO status signals are provided to buffer controller 133 and host computer 110, respectively. The asynchronous status signals are EMPTY, FULL, AEMPTY ("almost empty") and AFULL ("almost full"). The synchronous status signals are FULLS, AFULLS, EMPTYS and AEMTPYS. Status circuit 910 receives both the read and write addresses (RA and WA) generated by read and write counters 906 and 905, respectively, and their respective associated carry signals (RC and WC). In addition, write and read counters 905 and 906 also send their next addresses WAN and RAN and next carry values. Next addresses WAN and RAN and next carries RCN and WCN are tapped, respectively, from the Q[4:0]N bus and CRYN line at the input terminals of registers 1001a–1001f and register 1003 (see FIG. 10a). The asynchronous signals are generated according to the following conditions:

EMPTY is active when RA=WA and RC=WC

FULL is active when WA=RA and WC is not equal to RC

AEMPTY is active when WA=RAN and WC=RCN

AFULL is active when RA=WAN and RC=WCN

Using these status signals, two more output signals ATDREQ and HFAVAIL4H are generated, indicating that data transfer between host computer 110 and host FIFO 305, and availability of host FIFO 305, respectively. ATDREQ is generated taking into consideration, in addition to the availability of host FIFO 305, whether any transfers between buffer controller 133 and host FIFO 305 are completed.

The synchronous statuses are provided by an up-down counter in status circuit 910. The count ("Count") in the up-down counter is incremented when a datum is written into bank 903 or 904, and is decremented when a datum is read from banks 903 or 904. The synchronous status signals are provided by the following conditions (Count in hexadecimal):

FULLS is active when Count=18

EMPTYS is active when Count=0

AFULLS is active when Count=17

AEMPTYS is active when Count=1

Status circuit 910 derives from these synchronous status signals the signal HFAVAIL4B, which is active for write when the FIFO 305 is not empty, but goes inactive when AEMPTYS and BACK are active. HFAVAIL4B is active for read when FIFO 305 is not full, but goes inactive when AFULLS and BACK are active.

Host Wait Generation Circuit 307

Host wait generation circuit delays the IOCHRDY signal by a predetermined number of wait cycles, while IOW- and IOR- strobe signals are active.

Host IRQ Generation Circuit 308

As will be described below, two timers—the BUSY timer and the IRQ timer—are used in R/W state machine 310 to support automatic transfer mode. By setting specific mode (IRQMODE) bits in local mode registers 302 and host control register 304, integrated circuit 230 can be configured to assert the host interrupt IRQ signal for an Auto READ command (i) using only BUSY and IRQ timers only ("mode 0"), (ii) detecting host computer 110's reading the AT STATUS register prior to expiration of the BUSY or IRQ timer ("mode 1"), or (iii) detecting host computer 110's reading the AT STATUS Register ("mode 2").

As is known in the art, different implementation of the Basic Input and Output System (BIOS), an error condition may arise in which the host computer unintentionally clears a host interrupt IRQ signal during a READ command. Such error results because, the response time, such as provided by the benefits of the present invention results in a host interrupt IRQ signal can be asserted sooner than the designer of such BIOS expected.

In accordance with the present invention, under mode (1), a fixed time interval ("IRQ interval") between assertions of the host interrupt IRQ signal is tracked by a timer circuit (the "IRQ timer"). Under mode 0, the IRQ interval is designed to have a sufficient duration, so that the host interrupt IRQ signal will be regenerated at the end of the IRQ interval, thereby avoiding the error condition of an accidental reset of the host interrupt IRQ signal by host computer 110.

Alternatively, under mode 1, both an IRQ timer and a circuit for detecting host computer 110's reading of the AT STATUS register are provided. Under mode 1, in an Auto READ access, after the complete transfer on host bus 115 of the last sector or block, the host interrupt IRQ signal is set for the transfer of the next sector or block, upon detecting an access to the AT STATUS register prior to time out of the IRQ interval. Since host computer 110's access to the AT STATUS register is the usual source of accidental reset of the host interrupt IRQ signal, asserting IRQ after host computer's 110 access to the AT STATUS register ensure that the host interrupt IRQ signal would also avoid the error condition of an accidental reset of the host interrupt IRQ signal. Under mode 1, the IRQ timer provides a "fall back" position by asserting the IRQ signal at the end of the IRQ interval. Mode 1 has the advantage that the host interrupt IRQ signal is set at the earlier time of detecting host computer 110's access to the AT STATUS register and the time out of the IRQ interval.

Finally under mode 2, the host interrupt IRQ signal is set in an Auto READ command upon detection, since the complete transfer of the last sector or block, of host computer's access to the AT STATUS register.

Figure 14:
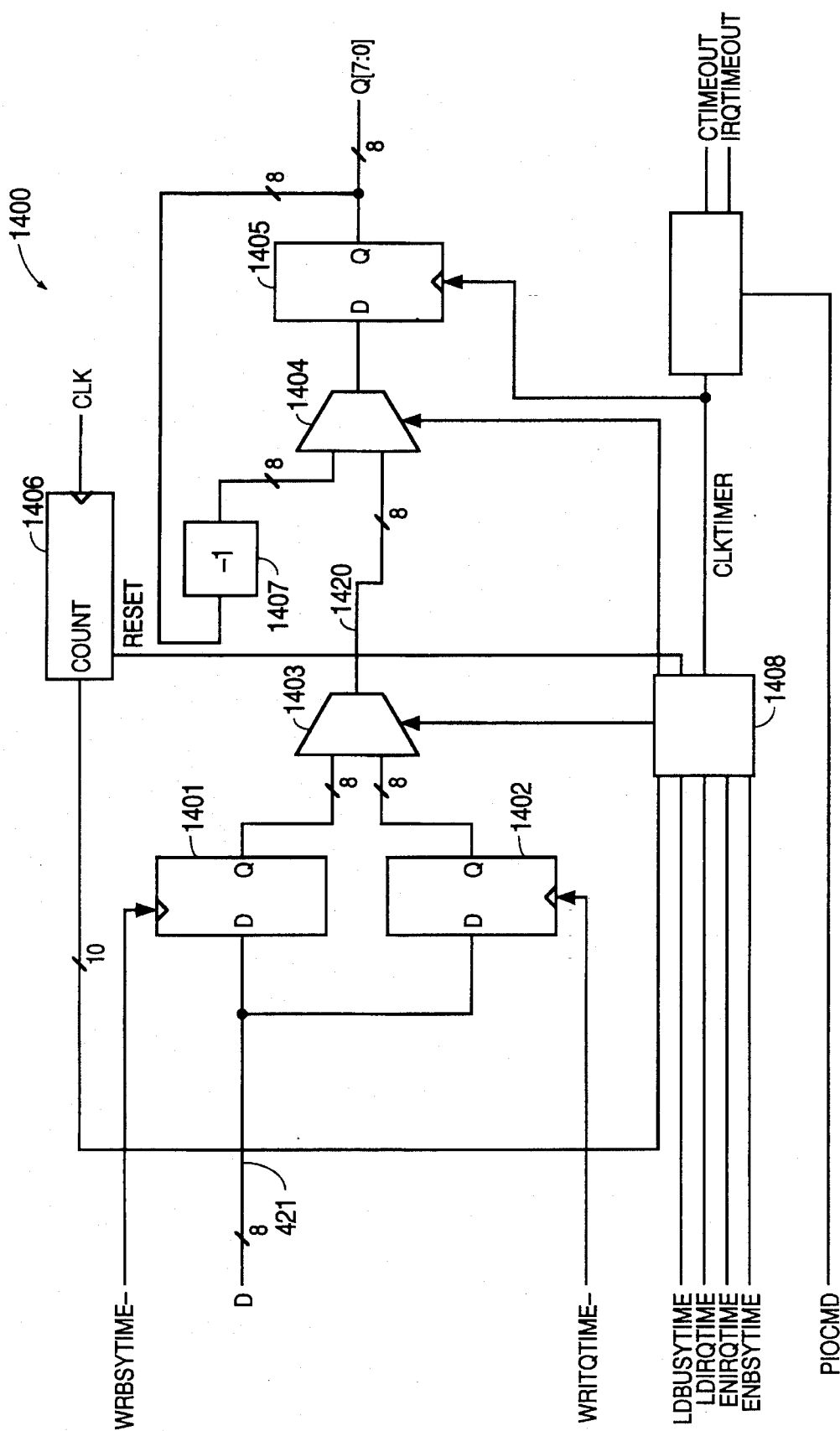
FIG. 14 is a block diagram showing a circuit 1400 for automatically regenerating an IRQ signal to host computer 110.

FIG. 14 shows a circuit 1400 which is shared between a BUSY timer and an IRQ timer. The BUSY timer marks a programmable time period of sufficient duration between the time the last sector from host computer 110 is transferred, to the time the status bit ATBUSY should be reset. The IRQ timer is used to assert the host interrupt IRQ signal again when an expected IOR- strobe signal is not received by integrated circuit 230.

As shown in FIG. 14, registers 1401 and 1402, responsive to load signals WRBSYTIME- and WRIRQTIME-, are provided to received from "D" bus 421 predetermined values for the BUSY and the IRQ timers, respectively. The BUSY timer and the IRQ timer shares circuit 1400, so that only one timer can be active at any given time. After the selected value of either register 1401 and 1402, depending on whether the BUSY timer or the IRQ timer is desired, is loaded into register 1405 through multiplexers 1403 and 1404, a count down is initiated Decrementer 1407, multiplexer 1404 and register 1405 form a down-counter which is updated by clock signal CLKTIMER.

Signal CLKTIMER is derived from dividing the frequency of input clock signal CLK by a predetermined amount. In the embodiment shown in FIG. 14, when the BUSY timer is active, the CLKTIMER signal is obtained by dividing in logic circuit 1408 by 16. Alternatively, when the IRQ timer is active, the CLKTIMER signal is obtained by dividing the frequency of the CLK signal by 2048.

Circuit 1400 provides two status signals CTIMEOUT ("time out" signal for the BUSY timer) and IRQTIMEOUT ("time out" signal for the IRQ timer), which are asserted when the value in register 1405 reaches zero.

Done Detect Circuit 309

Done detector 309 monitors control signal HSECADONE from buffer controller 133 to determine if a transfer of block or sector is complete. Done detector 309 provides the following output signals:

| Signal | Description |
| --- | --- |
| DONEH, DONEHL | an active high/low signal which during a WRITE command, becomes active while HXFR is active, and during a READ command, becomes active when control signal DONEB (below) is active, HXFR is set and AEMPTY is set. DONEH and DONEH1 are used to halt transfer between host computer 110 and host FIFO 305. |
| DONEB, DONEBL | an active high/low signal, which during a READ command, becomes active when both HSECADONE from buffer controller 133 and BACK are active, and during a WRITE command, becomes active when DONEH is set and AEMPTYS and BACK are both set. |

R/W State Machine 310

R/W state machine 310 is provided to enable an efficient automatic transfer mode, thereby minimizing intervention by microprocessor 121 during execution of a READ or WRITE command. R/W state machine 310 is a combination of a READ state machine and a WRITE state machine respectively described below. In one embodiment, the logic circuit for implementing the combined READ and WRITE state machines is generated automatically using a logic synthesis tool. An example of one such logic synthesis tool is available from Synopsys Corporation.

Figure 15A:
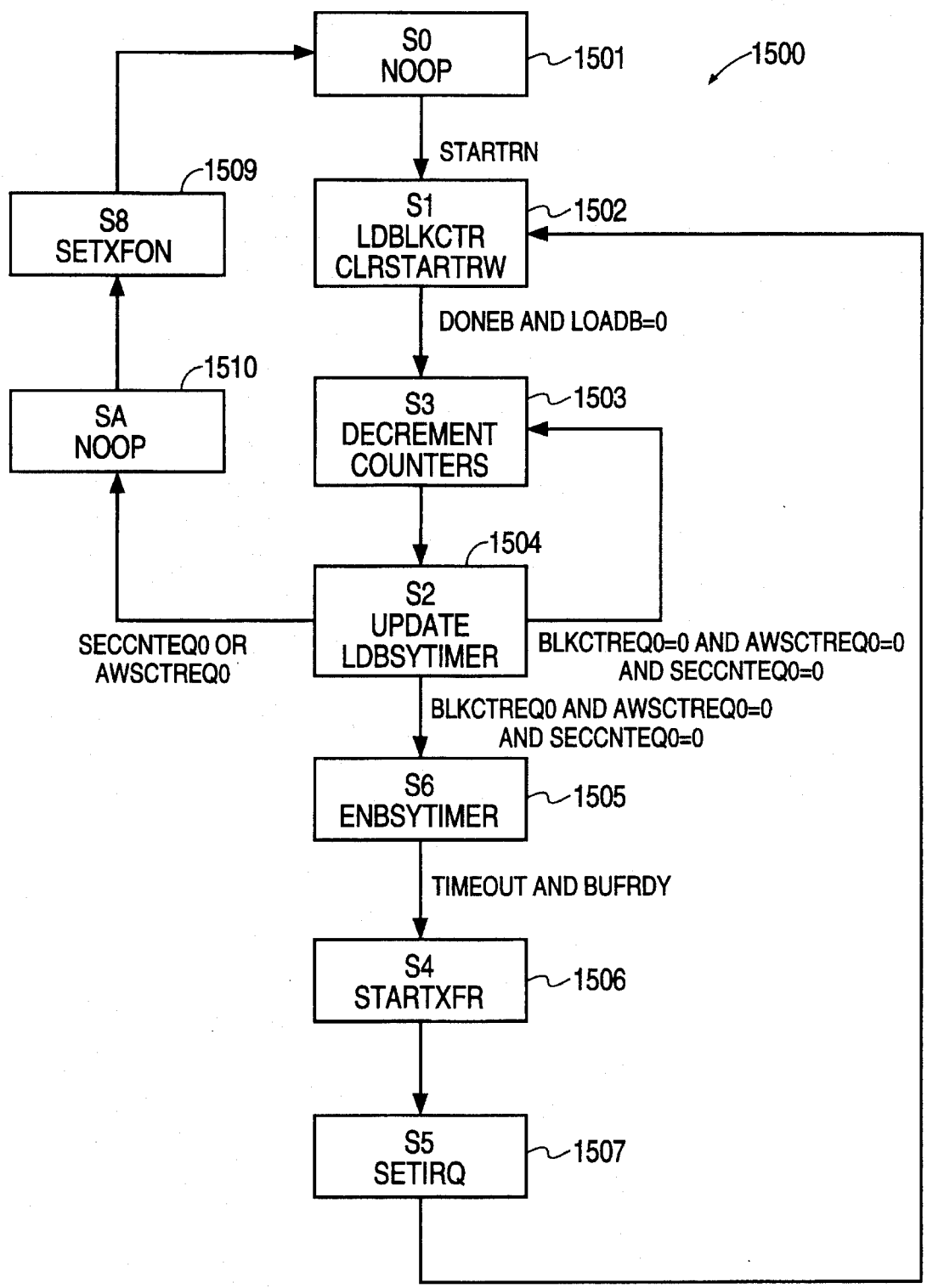
FIG. 15a is a block diagram of a WRITE state machine 1500 in accordance with the present invention.
Figure 15B:
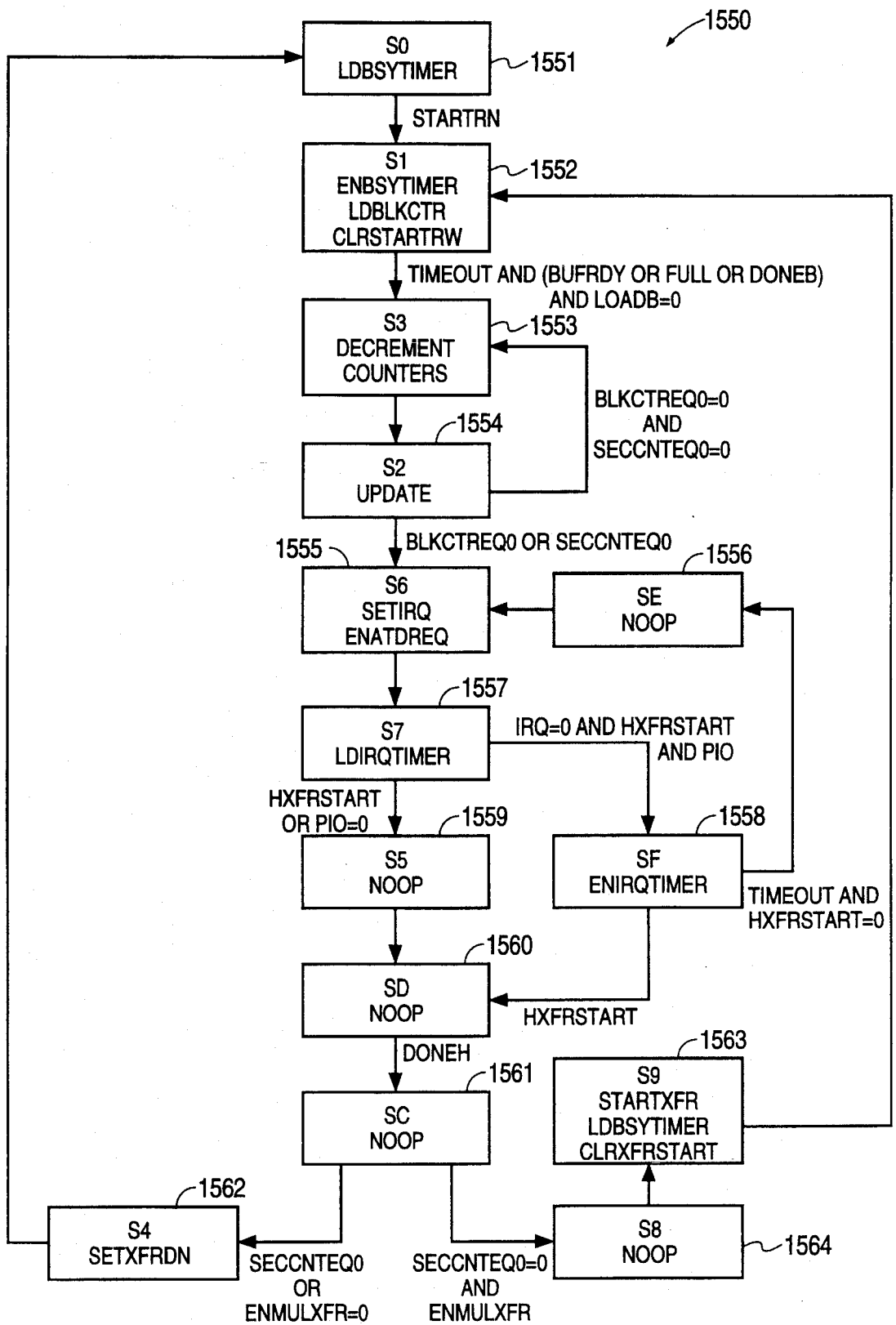
FIG. 15b is a flow diagram of a READ state machine 1550, in accordance with the present invention.

FIG. 15a is a state diagram of a WRITE state machine 1500 in accordance with the present invention. FIG. 15b is a block diagram of a READ state machine 1550, in accordance with the present invention. To facilitate reference between the VHDL listing and FIGS. 15a and 15b, the state assignments (Sx's) in the VHDL listing are also provided in FIGS. 15a and 15b.

In one mode of a WRITE operation under the transfer mode, the present invention provides an "automatic write sector counter" (AWSCTR), which is used to take advantage of the segmented architecture of buffer controller 133. The segmented architecture of buffer controller 133 are apparent to those of ordinary skill in the art.

Figure 16:
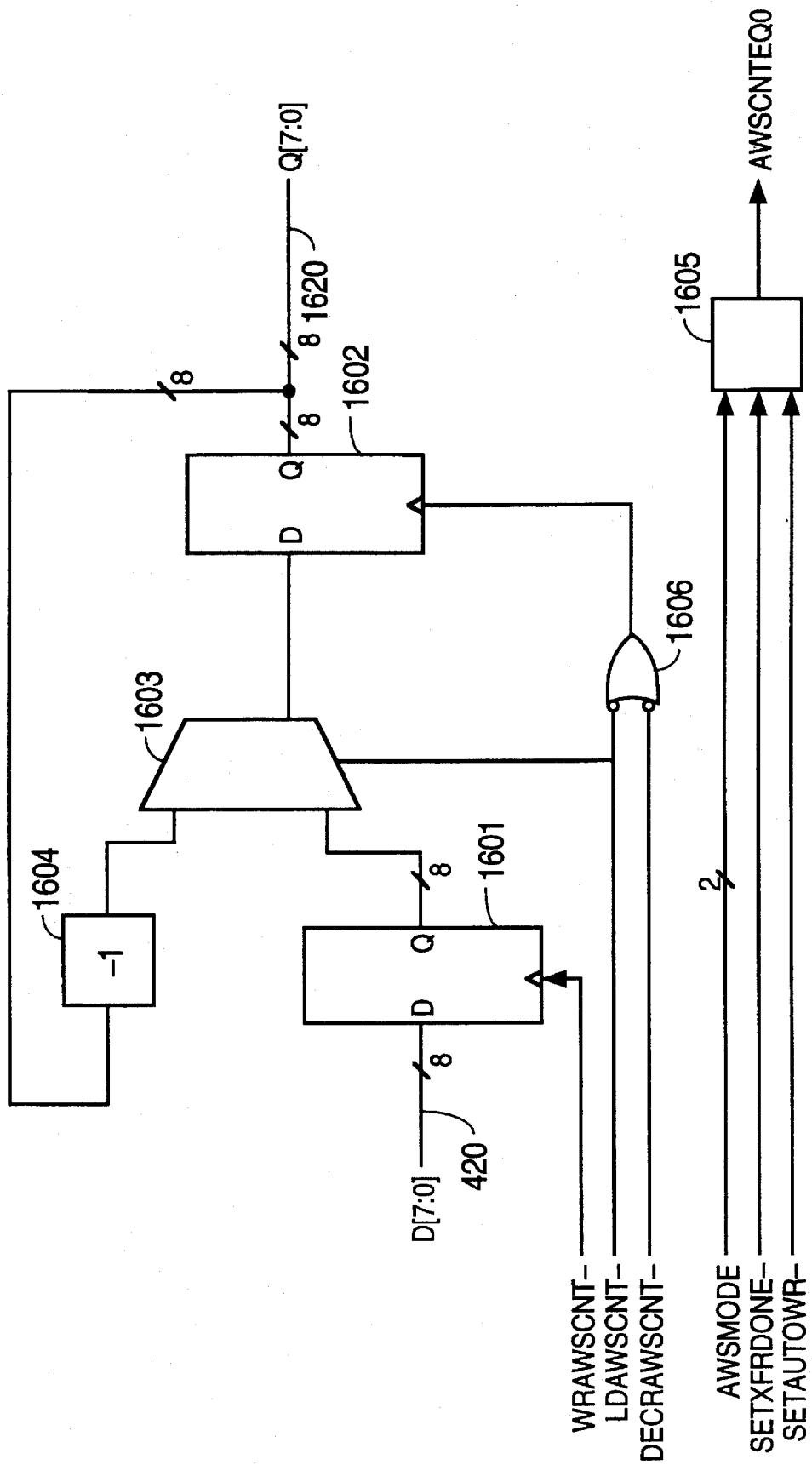
FIG. 16 is a flow diagram showing a circuit 1600 providing an "automatic write sector" counter (AWSCTR) in accordance with the present invention.

The use of AWSCTR under the automatic transfer mode is illustrated by FIG. 16, which shows one implementation 1600 of an AWSCTR. As shown in FIG. 16, an initial count ("AWSCNT") can be loaded into register 1600, in response to a strobe signal WRAWSCNT- generated by Command decoder 306. This AWSCNT value represent the maximum number of sectors which can be loaded in a particular segment of RAM 122. Whenever a write operation under the automatic transfer mode is initiated, register 1602 is loaded with this AWSCNT, in response to control signal LDAWSCNT-, which steers through multiplexer 1603, the value AWSCNT in register 1601 into register 1602. Thereafter, as each sector is transferred from host FIFO 305 into RAM 122, the output value of decrementer 1604 is loaded into register 1602 through multiplexer 1603. Since decrementer 1604 receives as input the value in register 1602 (provided as output of register 1602 on bus 1620), in effect, the value in register 1602 is decremented every time a sector is transferred from host FIFO 305 to RAM 122; or, equivalently, the data path including register 1602, decrementer 1604 and multiplexer 1603 forms an AWSCTR.

Transfer of sectors from host FIFO 305 to RAM 122 continues until either (i) the count in AWSCTR becomes zero, corresponding to an incomplete transfer when the number of sectors sought to be transferred under the automatic mode exceeds the largest memory segment in RAM 122, or (ii) the count in SECCNT register 403 becomes zero, corresponding to a successful transfer of all requested sectors. If AWSCTR becomes zero, microprocessor 121 needs to intervene either to increase the size of the available segment in RAM 122, or complete the remaining transfer under the manual transfer mode.

Circuit 1600 provides an output control signal AWSCNTEQ0, which is set under the automatic transfer mode, when the count in register 1602 becomes zero. AWSCNTEQ0 is reset by control signal SETXFRDONE- from R/W state machine 310 at the end of a transfer.

The automatic transfer mode allows multiple blocks to be transferred without processor intervention. Accordingly, a block counter ("BLKCTR"), similar to the SECCNT register 403 is provided to allow multiple block transfers.

Returning to discussion of WRITE state machine 1550 ("WRITE state machine") of FIG. 15a, initially the WRITE state machine is in state 1501 (state "S0"), a control signal STARTRW is generated when Command Decoder 306 or micrprocessor 121 sets HXFREN, indicating transfer between host computer 110 and host FIFO 305 is enabled. (As mentioned above, the automatic transfer mode is indicated by the control bit "ENMULXFR") WRITE state machine then enters state 1502 (state "S1"). In state 1502, WRITE state machine generates the active state of control signal LDBLKCTR to load BLKCTR (i.e. a counter similar to SECCNT register 403), and generates the active state of control signal CLRSTARTRW, to acknowledge receipt of signal STARTRW. WRITE state machine remains in state 1502 until the control signals DONEB is set and control signal LOADB is reset. Assertion of control signal DONEB corresponds to the complete transfer of a sector or block from host computer 110 to RAM 122 Reset of control signal LOADB corresponds to successfully loading the block counter with the block size.

Upon receiving the condition, DONEB and LOADB=0, WRITE state machine enters a loop consisting of states 1503 (state "S3") and 1504 (state "S2"). Except for a WRITE Multiple command, under any other WRITE commands (i.e. WRITE Sectors commands) the control signal BLKCTREQ0 is set to true, so that this 1503–1504 loop is executed exactly once. For a WRITE Multiple command, the number of times WRITE state machine is in either state 1503 and 1504 is the value (i.e. block size) loaded in the BLKCTR in state 1502. In state 1504, the BUSY timer is loaded in preparation for a possible state change, when the current block transfer is completed, to state 1505 (state "S6") in which the BUSY timer is enabled.

At state 1504, when SECCNTEQ0 is set, corresponding to a successful completion of data transfer under the current command, or AWSCTREQ0 is set, corresponding to the allocated buffer segment in RAM 122 becoming full, WRITE state machine enters a no-operation state 1510 (state "SA"), and then enters state 1509 (state "S8") to set control signal SETXFRDN. States 1510 is provided to keep the change in state address change to a one-bit change. From state 1509, WRITE state machine resets to state 1501.

When BLKCTREQ0 is set (i.e. complete transfer of a block in a WRITE Multiple command, or complete transfer of a sector in a WRITE Sectors command), WRITE state machine enters state 1505 (state "S6"), where the BUSY timer is enabled. In a WRITE Sectors command, the control signal BLKCTREQ0 is forced true, to force WRITE state machine to proceed from state 1504 to state 1505 when the control signals SECCNTEQ0 and AWSCTREQ0 are reset. The control signal STARTXRF is set in state 1506 (state "S4") to initiate the transfer of the next block, after the BUSY timer times out, and buffer controller 133 issues a BUFRDY signal. Thereafter, WRITE state machine enters state 1507 (state "S5"), setting the host interrupt IRQ signal to prompt computer 110 for the next block or sector of data to be written, and returns to state 1502 to wait for the completion of the current block or sector transfer.

Thus, the number of times the loop consisting of states 1502, 1503, 1504, 1505, 1506 and 1507 is executed is, in a WRITE Sectors command, the total number of sectors transferred and, in a WRITE Multiple command, the number of total number of sectors transferred divided by the block size (i.e. the number of blocks to be transferred).

According to READ state machine 1550 ("READ state machine"), shown in FIG. 15b, READ state machine is initially in state 1551 (state "S0"). In state 1551, READ state machine loads the BUSY timer with a programmed value. When the control signal STARTRW is received, READ state machine proceeds to state 1552 (state "S1") At state 1552, the BUSY timer is enabled (control signal ENBSYTIMER is set), the BLKCTR is loaded (control signal LDBLKCTR is set), and STARTRW is cleared (control signal CLRSTARTRW set). After (i) the BUSY timer times out (control signal TIMEOUT set), (ii) (a) control signal BUFRDY is set by buffer controller 113, (b) host FIFO 305 is full, or (c) control signal DONEB is set, and (iii) LOADB is reset, corresponding to a successful loading of BLKCTR, READ state machine enters a loop consisting of states 1553 ("state S3") and 1554 (state "S2"). In a READ Sectors command, the control signal BLKCTREQ0 is forced true, such that this 1553–1554 loop is executed a single time for each sector transferred under the command. In a READ Multiple command, the number of times the 1553–1554 loop is the value (i.e. the block size) loaded in BLKCTR at state 1552. In state 1553, both the BLKCTR and the SECCNT register 403 are decremented. In state 1554, the geometric address in SECNUM register 404, CYL register 405 and DRVHEAD register 406 is updated (UPDATE- active). When READ Sectors command is executed, READ state machine enters state 1555 (state "S6") after executing state 1554 once (BLKCTREQ0 is forced true). Otherwise, i.e. in a READ Multiple command, state 1555 is entered when the entire block is read (BLKCTREQ0 is set), or after the last sector is read (SECCNTEQ0 is set).

In state 1555, R/W state machine 310 sets the control signal SETIRQ and the control signal ATDREQ to indicate data is available for host transfer. Unconditionally, READ state machine enters state 1557 (state "S7"), where the IRQ timer is loaded. In state 1557, if the command in COMMAND register 407 is a direct memory access (DMA) command (control signal PIO=0), i.e. access by a DMA controller, rather than host computer 110, and host transfer is in progress (i.e. control signal HXTRFSTART is set), READ state machine enters state 1560 (state "SD") through state 1559 (state "S5"). Otherwise, in state 1557, READ state machine checks whether IRQ is still set (from state 1555). If the host interrupt IRQ signal has been reset, the IRQ timer is started in state 1558 (state "SF"), until either (i) the IRQ timer times out without seeing HXFRSTART set, or (ii) HXFRSTART is received.

In state 1558, if IRQ timer times out before HXFRSTART is set, READ state machine enters state 1555 through state 1556 (state "SE") to reset the host interrupt IRQ signal. Alternatively, if HXFRSTART is reset in state 1558 before the IRQ timer times out, state 1560 is entered.

In state 1560, when DONEH is set by done detector 309, i.e. transfer from host computer 110 is complete, READ state machine enters either state 1564 (state "S8") or state 1562 (state "S4") through state 1561, depending upon whether (i) additional sectors remain to be transferred, or (ii) completion of transfer (SECCNTEQ0), or automatic transfer mode is reset (ENMULXFR), respectively.

In state 1564, READ state machine proceeds to state 1563 (state "S9") where the Busy timer is reloaded, the control signal STARTXRF is set, and HXFRSTART is cleared (by setting control signal CLRHXFRSTART). Then, READ state machine enters state 1552.

Alternatively, in state 1562, READ state machine sets control signal SETXFRDN to return to state 1551. The number of times the loop including states 1552, 1553, 1554, 1555, 1557, 1560, 1561, 1564 and 1563 is executed is, in a READ Sectors command, the total number of sectors to be transferred and, in a READ Multiple command, the total number of sectors to be transferred divided by the block size (i.e. the number of blocks to be transferred).

Local Interrupt Control Circuit 311

Local interrupt control circuit 311 receives a number of control signals ("interrupt statuses") indicating conditions in which an interrupt control signal to microprocessor 121 is to be generated. In this embodiment, each interrupt status can be enabled or disabled by setting a bit in mode registers 320. The enable bits of these interrupt statuses form an enable mask.

The above detailed description is provided to illustrate the preferred embodiments of the present invention and is not intended to be limiting. Many variations and modifications within the scope of the preset invention are possible. The present invention is defined by the following claims.

```
-- VHDL code for auto read/write state machine
entity H_AUTOSM is
  port(CLOCK : in BIT;
       TIMEOUT, BLKCTREQ0, LOADB,
       START, ROP, DONEB, ENMULXFR,
       BUFRDY, FULL, SECCNTEQ0,
       AWSCTREQ0, HXFRSTART, IRQ, PIO,
       DONEH, RSTL : in BOOLEAN;
       LDBSYTIME_R, LDBSYTIME_W, ENBSYTIME_R, ENBSYTIME_W,
       LDBLKCTR, DECRBLKCTR,
       DECRSECCNTL, UPDATEL, SETIRQ_R, SETIRQ_W, SETENATDREQL,
       LDIRQTIME, ENIRQTIME, SETTFRDNL_R, SETTFRDNL_W,
       STARTXFRL_W, STARTXFRL_R,
       CLRHXFRSTL, CLRSTARTL, DECRAWSCTRL : out BIT );
end;

architecture BEHAVIOR of H_AUTOSM is
  type STATE_TYPE is (S0, S1, S2, S3, S4, S5, S6, S7,
                      S8, S9, SA, SB, SC, SD, SE, SF);
  signal CURRENT_STATE, NEXT_STATE : STATE_TYPE;
begin
-- Process to hold sequential elements (Flip-Flops)
SYNCH: process(CLOCK, RSTL)
begin
-- Asynchronous condition to go back to S0
  if (not RSTL) then
      CURRENT_STATE <= S0;
-- else normal synchronous operation
  elsif(CLOCK'event and CLOCK = '1') then
  CURRENT_STATE <= NEXT_STATE;
  end if;
end process;

COMBIN: process (CURRENT_STATE, RSTL, CLOCK,
         START, ROP, LOADB, DONEB, ENMULXFR,
         BUFRDY, FULL, DISUPD, BLKCTREQ0, SECCNTEQ0,
         AWSCTREQ0, HXFRSTART, IRQ, PIO,
         DONEH)

begin
-- default assignments
  NEXT_STATE <= CURRENT_STATE;
  LDBSYTIME_W <= '0';
  LDBSYTIME_R <= '0';
  ENBSYTIME_W <= '0';
  ENBSYTIME_R <= '0';
  LDBLKCTR <= '0';
  DECRBLKCTR <= '0';
  DECRSECCNTL <= '1';
  UPDATEL <= '1';
  SETIRQ_W <= '0';
  SETIRQ_R <= '0';
  SETENATDREQL <= '1';
  LDIRQTIME <= '0';
  ENIRQTIME <= '0';
  SETTFRDNL_W <= '1';
  SETTFRDNL_R <= '1';
  STARTXFRL_W <= '1';
  STARTXFRL_R <= '1';
```

```
CLRHXFRSTL <= '1';
CLRSTARTL <= '1';
DECRAWSCTRL <= '1';

-- State transitions and output logic
case CURRENT_STATE is
when S0 =>
    LDBSYTIME_R <= '1';
    if START then
      NEXT_STATE <= S1;
    else
      NEXT_STATE <= S0;
    end if;
when S1 =>
    ENBSYTIME_R <= '1'; -- only enable BSY for READ to save pwr
    LDBLKCTR <= '1';
    CLRSTARTL <= '0';
    if (not ROP and DONEB and not LOADB) or
         (ROP and TIMEOUT and (FULL or DONEB) and not LOADB) then
      NEXT_STATE <= S3;
    else
      NEXT_STATE <= S1;
    end if;
when S2 =>
    LDBSYTIME_W <= '1';
    UPDATEL <= '0';
    if (not BLKCTREQ0 and not SECCNTEQ0 and (ROP or not AWSCTREQ0))
then
      NEXT_STATE <= S3;
    elsif ((ROP and (BLKCTREQ0 or SECCNTEQ0)) or
           (not ROP and BLKCTREQ0 and not SECCNTEQ0 and not
AWSCTREQ0)) then
        NEXT_STATE <= S6;
    elsif (not ROP and (SECCNTEQ0 or AWSCTREQ0)) then
        NEXT_STATE <= SA;
    else
        NEXT_STATE <= S2;
    end if;
when S3 =>
    DECRAWSCTRL <= '0';
    NEXT_STATE <= S2;
    DECRBLKCTR <= '1';
    DECRSECCNTL <= '0';
when S4 =>
    SETTFRDNL_R <= '0';
    STARTXFRL_W <= '0';
    if (ROP) then
      NEXT_STATE <= S0;
    else
      NEXT_STATE <= S5;
    end if;
when S5 =>
    SETIRQ_W <= '1';
    if (ROP) then
      NEXT_STATE <= SD;
    else
      NEXT_STATE <= S1;
    end if;
when S6 =>
    ENBSYTIME_W <= '1';
    SETENATDREQL <= '0';
    SETIRQ_R <= '1';
    if ROP then
      NEXT_STATE <= S7;
```

```vhdl
        elsif (not ROP and TIMEOUT and BUFRDY) then
            NEXT_STATE <= S4;
        else
            NEXT_STATE <= S6;
        end if;
    when S7 =>
        LDIRQTIME <= '1';
        if(HXFRSTART or not PIO) then
            NEXT_STATE <= S5;
        elsif (not IRQ and not HXFRSTART and PIO) then
            NEXT_STATE <= SF;
        else
            NEXT_STATE <= S7;
        end if;
    when S8 =>
        SETTFRDNL_W <= '0';
        if (ROP) then
            NEXT_STATE <= S9;
        else
            NEXT_STATE <= S0;
        end if;
    when S9 =>
        STARTXFRL_R <= '0';
        LDBSYTIME_R <= '1';
        CLRHXFRSTL <= '0';
        NEXT_STATE <= S1;
    when SA =>
        NEXT_STATE <= S8;
    when SC =>
        if (not SECCNTEQ0 and ENMULXFR) then
            NEXT_STATE <= S8;
        else
            NEXT_STATE <= S4;
        end if;
    when SD =>
        if (DONEH) then
            NEXT_STATE <= SC;
        else
            NEXT_STATE <= SD;
        end if;
    when SE =>
        NEXT_STATE <= S6;
    when SF =>
        ENIRQTIME <= '1';
        if (HXFRSTART) then
            NEXT_STATE <= SD;
        elsif (TIMEOUT and not HXFRSTART) then
            NEXT_STATE <= SE;
        else
            NEXT_STATE <= SF;
        end if;
    end case;
end process;
end BEHAVIOR;
```

I claim:

1. In a disk controller communicating with a host computer over an AT bus, a method for setting a host interrupt during a READ command transferring multiple groups of data, said method comprising the steps of:

providing, in said disk controller, a host interrupt generation circuit coupled to said AT bus for asserting an IRQ signal on an interrupt line of said AT bus, asserting, using said host interrupt generation circuit, a first host interrupt IRQ signal on said interrupt line to initiate a transfer to said host computer a first group of said data;

transferring said first group of data between said disk controller and said host computer; and asserting, using said host interrupt generation circuit, upon occurrence of an event, a second host interrupt IRQ signal on said interrupt line to initiate a transfer to said host computer a second group of said data upon occurrence of an event, said event being configurable to occur under a selected one of the following conditions:

(i) elapse of a predetermined time interval according to a timer, (ii) the earlier of either (a) said host computer reading an AT status register, or (b) elapse of said predetermined time interval according to said timer, and (iii) said host computer reading said AT status register.

2. In a disk controller communicating with a host computer over an AT bus, including a transfer circuit for transferring groups of data between said disk controller and said host computer, a host interrupt generation circuit for setting a host interrupt IRQ signal on an interrupt line of said AT bus during a READ command transferring multiple groups of data comprising:

a first circuit for asserting a first host interrupt IRQ signal on said interrupt line to initiate transfer by said transfer circuit to said host computer a first group of said data; and a second circuit including a timer for asserting, upon occurrence of an event, a second host interrupt IRQ signal on said interrupt line to initiate a transfer by said transfer circuit to said host computer a second group of said data, said event being configurable to occur under a selected one of the following conditions:

(i) elapse of a predetermined time interval according to said timer, (ii) the earlier of either (a) said host computer reading an AT status register, or (b) elapse of said predetermined time interval according to said timer, and (iii) said computer reading said AT status register.

* * * * *